US006654083B1

(12) United States Patent
Toda et al.

(10) Patent No.: US 6,654,083 B1
(45) Date of Patent: Nov. 25, 2003

(54) ELECTRONIC OPTICAL DEVICE AND METHOD FOR PRODUCING THE SAME, AND PROJECTION TYPE DISPLAY DEVICE

(75) Inventors: Shigeo Toda, Nagano-Pref. (JP); Hiromi Saito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/150,082

(22) Filed: Sep. 9, 1998

(30) Foreign Application Priority Data

Sep. 11, 1997 (JP) .............................................. 9-247299
Feb. 13, 1998 (JP) ............................................ 10-031592

(51) Int. Cl.[7] .......................................... G02F 1/1333
(52) U.S. Cl. ...................... 349/110; 349/58; 349/122; 349/158
(58) Field of Search ................................ 349/158, 110, 349/111, 58, 122

(56) References Cited

U.S. PATENT DOCUMENTS 5,155,612 A   10/1992   Adachi et al.
5,737,050 A * 4/1998   Takahara et al. ............ 349/122
5,852,487 A * 12/1998  Fujimori et al. ............ 349/162
5,892,560 A * 4/1999   Yoshida et al. ............... 349/89
6,069,677 A   5/2000   Kitai

FOREIGN PATENT DOCUMENTS

JP   63-264720   11/1988
JP   09-113906    5/1997

* cited by examiner

Primary Examiner—Tarifur R. Chowdhury
(74) Attorney, Agent, or Firm—Oliff & Berridge, PLC

(57) ABSTRACT

The present invention provides a high quality electronic optical device by preventing flaws and dust from adhering on substrates, between which a liquid crystal is inserted, and by suppressing a temperature increase caused by irradiation of light from a light source. The present invention also provides a projection type device using the electronic optical device and a method for producing the electronic optical device. Flaws and dust are never adhered on an outer face of an active matrix substrate because a planar surface of a third substrate is adhered with an adhesive on the outer face of the active matrix substrate in the electronic optical device. Even when flaws and dust are adhered on an outer face of the third substrate, such flaws and dust are not displayed on the projection image. Forming a light-shielding film on the third substrate allows the design margin of a case to be enlarged.

40 Claims, 15 Drawing Sheets

ELECTRONIC OPTICAL DEVICE AND METHOD FOR PRODUCING THE SAME, AND PROJECTION TYPE DISPLAY DEVICE

BACKGROUND OF THE INVENTION

1. Field of Invention

The present invention relates to a electronic optical device, a projection type device using the same, and a method for producing the electronic optical device. In more detail, the present invention relates to a construction technology of the outer face of the two sheets of transparent substrates inside of which a liquid crystal is disposed, and a technology for forming the construction.

2. Description of Related Art

As shown in FIG. 16, the electronic optical device is mainly composed of an active matrix substrate 300 (a first transparent substrate) on which pixel electrodes and pixel switching elements are formed, an opposite substrate 400 (a second transparent substrate) on which opposite electrodes are formed, and one example of a electronic optical material, a liquid crystal (LC) disposed between the active matrix substrate 300 and opposite substrate 400. The liquid crystal (LC) is filled in the area divided by the substrates with a seal layer 80 between the active matrix substrate 300 and the opposite substrate 400. Alignment of the liquid crystal is controlled for each pixel between the active matrix substrate 300 and the opposite substrate 400.

Accordingly, in the projection type device in which a electronic optical device having a construction as described above is used as a light valve, the light projected from a light source is condensed by a condenser optical system to guide the light to the electronic optical device and a desired image is projected with magnification on a projection plane such as a screen by a magnifying projection optical system after optically modulating the projected light with the electronic optical device.

Although the electronic optical device constructed as described above is usually mounted in a light-shielding case provided with an opening corresponding to the display area, contours of the display area are usually defined by the light-shielding film (referred to as a partitioning periphery hereinafter) made of Cr (chromium) and the like on the opposite substrate 400. In other words, a design margin at the opening of the case is ensured by the width of the partitioning periphery since it is difficult for the edge of the opening of the case formed of a plastic and the like to have a sufficient dimensional accuracy due to the presence of burrs at the edge. According to this art, problems that the display area is hidden behind the opening of the case or the panel portion outside of the display area at the outer circumference of the partitioning periphery is exposed from the opening can be avoided when the opening of the case is formed with an accuracy enough for accommodating the opening of the case within the width of the partitioning periphery viewed from the front of the display area.

However, since the outer face 302 of the active matrix substrate 300 or the outer face 402 of the opposite substrate electrode 400 is only separated by the thickness of these transparent substrates, for example 1 mm, when viewed from the liquid crystal (LC), the light focusing on the liquid crystal (LC) is also focusing on flaws and dust adhered on the outer face of these transparent substrates. Consequently, flaws and dust as small as 10 to 20 $\mu$m are displayed in the projection image, deteriorating the image quality.

A partial temperature increase is liable to occur as a result of making the thickness of the active matrix substrate 300 and the opposite substrate 400 thin, because an intense light is illuminated from the light source to the electronic optical device in the projection type device The partial heated portion has a different transmittance from that of the surrounding area, thereby also deteriorating the image quality. Such partial temperature increase may be a cause to deteriorate the liquid crystal.

Japanese Unexamined Patent Publications No. 9-105901 and No. 9-113906 have proposed a construction as shown in FIG. 17, wherein a transparent substrate 102 is attached on the outer face 302 of the active matrix substrate 300 via an air layer (air) using a bonding material 101, thereby suppressing a temperature increase of the electronic optical device by heat radiation from this transparent substrate 102 along with preventing flaws and dust from adhering on the outer face 302 of the active matrix substrate 300 owing to this transparent substrate 102. However, boundary faces between the active matrix substrate 300 and the air layer, and between the air layer (air) and the transparent substrate 102 are added as new reflection boundary faces as a consequence of disposing the opposite transparent substrate 102 on the outer face 302 of the active matrix substrate 300 via an air layer (air) in the electronic optical device having the construction shown in FIG. 17, thereby increasing reflection at the boundary face. Accordingly, luminous energy loss is increased to cause a new problem that the projected image becomes dark in the electronic optical device with the construction shown in FIG. 17. While it may be devised that a reflection preventing film is deposited in vacuum on the outer face 302 of the active matrix substrate 300 and on the inner face 104 of the transparent substrate 102, forming such reflection preventing films requires much labor in a vacuum atmosphere, resulting in a large increase of the production cost of the electronic optical device. Disposing only a transparent substrate 102 on the outer face 302 of the active matrix substrate 300 cannot yet prevent dust from adhering on the outer face 302 of the active matrix substrate 300. Consequently it has been impossible to perfectly prevent the display image quality from being deteriorated.

As hitherto described, there is a first problem that the dust-preventive function, de-focusing function and heat radiation function cannot be improved at once with a low production cost and good balance in the conventional electronic optical device.

In the field of current electronic optical devices, on the other hand, demands for making the panel small and fine, or demands for ensuring a large display area in a limited panel face have been increasing, forcing the necessity to narrow the width of the partitioning periphery provided at the opposite substrate as described previously. The width of the partitioning periphery is also required to be narrow, especially in adhering both substrates with an adhesive comprising an ultraviolet light curing type resin, so as not to block ultraviolet light irradiation from the outer face of the substrate because the seal area for bonding both substrates with an adhesive exists in the vicinity of the partitioning periphery. Consequently, there arises a second problem that the design margin at the opening portion of the case is reduced as the width of the partitioning periphery is narrowed in the art for ensuring the design margin of the opening portion of the case by using the width of the partitioning periphery.

Furthermore, there arises another problem that ghost images of the auxiliary circuits and elements provided in the panel are mixed with the projecting light depending on the angle of the incident light and projecting light, when the electronic optical device provided with the partitioning periphery is used for the projection type display device and the transmissive display device provided with a back light, especially when the width of the partitioning periphery is narrowed.

SUMMARY OF THE INVENTION

Accordingly, an object of the present invention is to solve the foregoing first problem, by providing a electronic optical device with a high image quality and a projection type device using the same, wherein flaws and dust are prevented from adhering on the transparent substrates, between which a liquid crystal is inserted, without significantly increasing the production cost by improving the construction of the outer faces of two sheets of transparent substrates for disposing a liquid crystal, along with suppressing temperature increase ascribed to irradiation of light from the light source.

Another object of the present invention is to provide a method for producing electronic optical devices capable of producing such electronic optical devices with a high quality.

Another object of the present invention is to solve the foregoing second problem, providing a electronic optical device in which the design margin of the opening portion of the case can be enlarged while enhancing the dust preventive function against dust and defocusing function against dust and flaws, and a projection type device provided with the same.

For solving the problems described above, the present invention provides a electronic optical device having a first transparent substrate on which pixel electrodes are formed, a second transparent substrate opposing the first transparent substrate and a liquid crystal disposed between the first and second transparent substrates. A planar surface of a third transparent substrate having an approximately equal refractive index to at least one of the first and second transparent substrates is adhered to an outer surface of at least one of the first transparent substrate and the second transparent substrate with an adhesive that has an approximately equal reflection index to at least one of the transparent substrates.

In the specification according to the present invention, an inner surface refers to a surface at the side where the liquid crystal is situated, while the outer surface refers to a surface at an opposite side where the liquid crystal is situated, of the both surfaces of the transparent substrate.

Flaws and dust are hardly adhered on the outer surface of the first or second transparent substrate in the electronic optical device constructed as described above, since the planar surface of the third transparent substrate is adhered to the outer surfaces of the two sheets of the transparent substrates (the first and second transparent substrates) forced to be positioned in the vicinity of the liquid crystal because the liquid crystal is inserted between them. The outer surface of the third transparent substrate is always de-focused because a distance corresponding to the thickness of this third transparent substrate is maintained between the outer surface of the third transparent substrate and the liquid crystal. The image quality becomes high because flaws and dust are never displayed on the projection image even when flaws and dust are adhered on the outer surface of the third transparent substrate.

No reflection boundary face is considered to be present in the spaces between the first or second transparent substrate and the adhesive and between the adhesive and the third transparent substrate, since both of the adhesive and the third transparent substrate have an approximately equal refractive index to the refractive index of the substrates on which the third transparent substrate is adhered. Accordingly, the light guided from the light source efficiently transmits through the electronic optical device, resulting in a very small luminous energy loss. Increase of the production cost can be therefore suppressed because forming reflection preventive films between each transparent substrate and the adhesive is not required. There is also an advantage that the chances of switching elements malfunctioning due to this reflection light can be excluded. Moreover, since the adhesive has a refractive index approximately equal to the refractive index of the first or second transparent substrate on which the adhesive is coated, flaws generated on the first or second transparent substrate in the production process of the electronic optical device are buried with the adhesive that is used to restore the flaws.

The electronic optical device has a larger heat capacity corresponding to the addition of the third transparent substrate. Accordingly, temperature increase in the electronic optical device remains small with no partial temperature increase, preventing dispersion of the transmittance and deterioration of the liquid crystal due to temperature difference and thereby improving the image quality.

When the planar surface of the third transparent substrate is adhered to the outer surface of the first transparent substrate in the present invention, a film having a light polarizing function or a reflection preventing function may be laminated on the outer surface of at least one of the third and the second transparent substrates. On the contrary, when the planar surface of the third transparent substrate is adhered on the outer surface of the second transparent substrate, a film having a polarizer function or a reflection preventing function may be laminated on the outer surface of at least one of the third and the first transparent substrates. Further, when the planar surface of the third transparent substrates are adhered on both of the outer surfaces of the first transparent substrate and second transparent substrate, a film having a polarizer function or a reflection preventing function may be laminated on the outer surface of at least one of the two sheets of the third transparent substrates.

It is preferable in the present invention that the adhesive remains elastic after being cured. In this construction, stress accompanied by curing the adhesive can be relaxed by the adhesive itself, leaving no distortion on the transparent substrate. For example, when the degree of penetration of the adhesive after being cured is larger than 60 and smaller than 90, distortion of the transparent substrate can be prevented from being generated along with relaxing the stress. The thickness of the adhesive is preferably 5 to 30 $\mu$m. A thickness of at least 5 $\mu$m allows the flaws adhered on the substrate to be covered with the adhesive as well as relaxing the stress.

Flaws and dust adhered on the transparent substrate never deteriorate the image quality in the electronic optical device constructed as described above, which is suitable for use in the projection type device having a light source, a condenser optical system that condenses the light projected from the light source to guide it to the electronic optical device, and a magnifying projection optical system that projects the light optically modulated with the electronic optical device on a projection plane with magnification. While the image quality tends to be deteriorated by the influence of the flaws and dust adhered on the transparent substrate because the image is projected with magnification in this type of the electronic optical device, these problems can be solved when the electronic optical device to which the present invention is applied is used. While an intense light from the light source is illuminated in the projection type device, failures due to the temperature increase can be avoided from occurring by using the electronic optical device to which the present invention is applied even when such an intense light is irradiated.

It is preferable in the method for producing the electronic optical device according to the present invention comprising the step for adhering the planar surface of the third transparent substrate that, after coating both surfaces of the inner surface of the third transparent substrate and the outer surface of the transparent substrate on which the planar surface of the third transparent substrate is adhered with the adhesive before curing it, the adhesive is spread by joining two sheets of the transparent substrates together by taking advantage of these adhesives on both surfaces as a primary contact point, followed by curing the adhesive.

It is preferable in the method for producing the electronic optical device according to the present invention comprising the step for adhering the planar surface of the third transparent substrate that, after surrounding the periphery of the area, of the spaces between the third transparent substrate and the transparent substrate on the outer surface of which the planar surface of the third transparent substrate is adhered, where the adhesive is to be coated with a seal material provided with a partial cut-off portion as an injecting port of the adhesive, the area divided with the seal material is evacuated of air to inject the adhesive in vacuum from the adhesive port into the area, followed by curing the adhesive.

According to the production method, the planar surface of the third transparent substrate can be adhered without leaving any air bubbles in the adhesive.

It is preferable that solid gap materials for keeping the thickness of the adhesive layer constant are added in the seal material.

For solving the problems previously described, the electronic optical device provides a electronic optical device provided with a first transparent substrate in which pixel electrodes are formed on the display area; a second transparent substrate opposing the first transparent substrate; a liquid crystal disposed between the second transparent substrate and first transparent substrate; a third transparent substrate provided at the outer surface side of at least one of the first transparent substrate and the second transparent substrate; and a first light-shielding partitioning periphery provided at the third transparent substrate to define the display area.

The electronic optical device is enhanced in its dust preventive function against dust because the third transparent substrates are provided on one or both of the outer surfaces (or the sides opposite to the surfaces confronting the liquid crystal) of the first and second transparent substrates. At the same time, the de-focusing function against flaws and dust adhered on the surface of the third transparent substrate is also enhanced in response to the thickness of the third transparent substrate. For example, the de-focusing function is improved as the third transparent substrate becomes thicker. A first light-shielding film defining the display area is provided on the third transparent substrate. Different from the partitioning periphery built in the conventional electronic optical device, the first partitioning periphery (first light-shielding partitioning periphery) can be provided from the contours of the display area to the edge of the transparent substrate. In other words, providing such partitioning periphery does not prevent ultraviolet light irradiation for curing the ultraviolet light curing resin in the seal area. Because the width of the first light-shielding film can be enlarged as described above, the design margin at the opening of the case is possible to be expanded in accordance with the larger width of the first light-shielding film. Further, the overall heat capacity of the electronic optical device is increased by adding the third transparent substrate, also suppressing the temperature increase due to the incident light in the electronic optical device by virtue of the presence of the light-shielding partitioning periphery. The light-shielding performance in the vicinity of the edge of the electronic optical device can be improved by providing the first light-shielding film when this electronic optical device is applied to a projection type display device such as a liquid crystal projector or a transmissive display device using a back light, thereby preventing ghost images of the auxiliary circuits and elements in the panel as described previously.

The electronic optical device is provided with the first light-shielding film in the area surrounding the display area expanded from contours of the display area to edges of the third transparent substrate.

In the electronic optical device, the width of the first transparent substrate can be expanded by a maximum utilization of the third transparent substrate surface without narrowing the display area, since the first light-shielding film is provided at the area surrounding the display area from the contours of the display area to the edge of the third transparent substrate. Accordingly, the design margin in the vicinity of the edge of the electronic optical device can be expanded in response to the enlargement of this width. As a result of especially improved light-shielding performance in the vicinity of the edge of the electronic optical device, ghost images of the auxiliary circuits and elements in the panel can be also prevented.

The electronic optical device is provided with a second light-shielding film provided at one of the first and second transparent substrates to define the display area, wherein the second light-shielding film is provided so that it does not overlap with the area for forming a seal material to be provided between the first and second transparent substrates, along with being provided inside of the area for forming the seal material.

The second light-shielding film provided at one of either the first or the second transparent substrates in the electronic optical device corresponds to the partitioning periphery built in the conventional electronic optical device, wherein the second light-shielding film is provided so that it does not overlap with the area for forming a seal material to be provided between the first and second transparent substrates, along with being provided inside of the area for forming the seal material. Because irradiation of the ultraviolet light is made possible through the gap between the seal material and the partitioning periphery, the area near the edge of the first and second substrate can be sufficiently adhered with the ultraviolet light curing adhesive. Since the first light-shielding film can be formed up to the edge of the transparent substrate as described above without forming the second light-shielding film up to the edge of the transparent substrate, the design margin of the opening of the case can be enlarged by the first light-shielding film without being restricted by the location and width of the second partitioning periphery (second light-shield partitioning periphery).

In the electronic optical device, at least the outer face side of the first light-shielding film is formed of a light reflection film having an OD (Optical Density) value of 2 or more.

In the electronic optical device, at least the outer surface side (the side opposite to the side of the surface opposing the liquid crystal) of the first light-shielding film is formed of a light-reflecting film of, for example, a metallic reflection film such as Al. Therefore, the first light-shielding film serves as a light shielding film along with reflecting the incident light from outside of the third transparent substrate to the peripheral area of the electronic optical device, making it possible to effectively prevent the temperature of the electronic optical device from being increased due to the incident beam as compared with the case when the first light-shielding film is not provided at the third transparent substrate.

In the electronic optical device, at least the inner surface side of the first light-shielding film is formed of a light absorption film having an OD value of 2 or more.

In the electronic optical device, the inner surface side (the side facing to the liquid crystal) of the first light-shielding film is formed of a light absorption film such as, for example, a resist film or a resin film having an OD value of 2 or more. The light absorption film herein refers to a film having a reflection ratio of 20% or less. Consequently, the first light-shielding film serves as a light shielding film along with absorbing the reflection light or multiple reflection light comprising the light reflected from the first and second transparent substrates, the peeled face of the third transparent substrate and the second light-shielding film. Accordingly, the first light-shielding film is able to prevent the multiple reflection light from the transparent substrates and from the film constructing the partitioning periphery from being projected out of the electronic optical device beforehand.

In the electronic optical device, at least the outer surface side of the second light-shielding film is formed of a light absorption film having an OD value of 2 or more.

The outer surface side of the electronic optical device is formed of a light absorbing film such as, for example, a resist film or a resin film having an OD value of 2 or more. Consequently, the second light-shielding film serves as a light-shielding film along with preventing the reflection light and multiple reflection light from being generated by absorbing the incident light from outside of the third transparent substrate to the display area of the electronic optical device, also preventing the multiple reflection light due to the transparent substrates and films comprising the partitioning periphery from projecting out of the electronic optical device.

The electronic optical device is provided with an opening corresponding to the first light-shielding film along with being further provided with a light-shielding case for accommodating the first and second transparent substrates and said third transparent substrate.

In the electronic optical device, the first and second transparent substrates and the third transparent substrate are accommodated (mounted) in a light-shielding case, the opening of the case being provided in accordance with the first light-shielding film. Therefore, the design margin of the opening can be enlarged according to the width of the first light-shielding film.

In the electronic optical device, the third transparent substrate has a thickness of 1.0 mm or more.

Since the third transparent substrate in the electronic optical device has a thickness of about 1.0 mm or more, the de-focusing performance of the third transparent substrate is more improved, besides suppressing the temperature increase owing to the first light-shielding film provided at the third transparent substrate.

In the electronic optical device, the third transparent substrate and one of the first and second transparent substrates in adjoining relation to the third transparent substrate are formed of a material having an approximately the same refractive index with each other.

In the electronic optical device, reflection at the boundary surface between the third transparent substrate and the first or second transparent substrate in adjoining relation thereto can be reduced in accordance with similarity of the refractive index of the materials comprising both of the substrates.

In the electronic optical device, the third transparent substrate and one of the first and second transparent substrates in adjoining relation to the third transparent substrate are adhered with an adhesive having an approximately equal refractive index to the refractive indices of the transparent substrates.

In the electronic optical device, reflection at the boundary between the third transparent substrate and the first or second transparent substrates in adjoining relation to the third transparent substrate can be reduced in accordance with similarities in the refractive index of the materials comprising these transparent substrates and in the refractive index of the adhesive. Such refraction at the boundary can be markedly reduced especially when the substrates are bonded with their planes with the adhesive.

In the electronic optical device, a void space is provided between the third transparent substrate and one of the first and second transparent substrates in adjoining relation to the third transparent substrate.

Since the first or second transparent substrates in adjoining relation to the third transparent substrate are able to radiate heat via the space in the electronic optical device, the heat increment especially in the vicinity of the liquid crystal is possibly suppressed.

In the electronic optical device, a refection preventive film is formed on the outer surface of the third transparent substrate.

The incident light projecting to the outer surface of the third transparent substrate is projected to the liquid crystal through the third transparent substrate only slightly being reflected by virtue of the reflection preventing film in the electronic optical device. Accordingly, the luminous energy loss at the display area can be reduced along with making the display image luminous. Specifically, there is no need for disposing the reflection preventing film at the outer surface side of the transparent substrate when the electronic optical device is mounted.

The projection type device is provided with a electronic optical device having a light source, a condenser system that condenses the light projected from said light source to guide it to the electronic optical device, and a magnifying projection optical system that projects the optically modulated light with the electronic optical device on a projection plane with magnification.

The projection type device is excellent in at least one of the dust-preventing function, de-focusing function and ghost image preventing function as described above along with being provided with the electronic optical device that is able to enlarge the margin of the case opening, thereby realizing a projection type device that is able to display an image with a good image quality.

The electronic optical device is provided with a first transparent substrate in which pixel electrodes are formed in the display region, a second transparent substrate opposing the first transparent substrate, a liquid crystal disposed between the first transparent substrate and second transparent substrate and a third transparent substrate provided at the outer surface side of the transparent substrate of at least one of the first and second substrates, wherein a plurality of micro-lenses are disposed to form a matrix corresponding to respective pixel electrode on the second transparent substrate.

Improvement of efficiency of light utilization as well as the substantial opening ratio of each pixel are possible by virtue of the micro-lenses. Furthermore, since heat absorption of the electronic optical device can be also prevented by the micro-lenses, heat absorption at the electronic optical device can be prevented even if the overall thickness of the electronic optical device has made larger by providing the third substrate.

The projection type device is provided with a electronic optical device having a light source, a condenser optical system for condensing the light projected from the light source to guide it to the electronic optical device, and a magnifying projection optical system for projecting the light optically modulated with the electronic optical device on a projection plane with magnification.

The projection type device is excellent in the dust preventing function, de-focusing function and heat radiation function, realizing a projection type device capable of display of high quality images with a relatively low cost.

These functions and other advantages of the present invention will be made clear by the embodiments to be described hereinafter.

BRIEF DESCRIPTION OF THE DRAWINGS

FIG. 4A is a block diagram of the active matrix substrate used for the electronic optical device according to the present invention, while

DETAILED DESCRIPTION OF PREFERRED EMBODIMENTS

Figure 1:
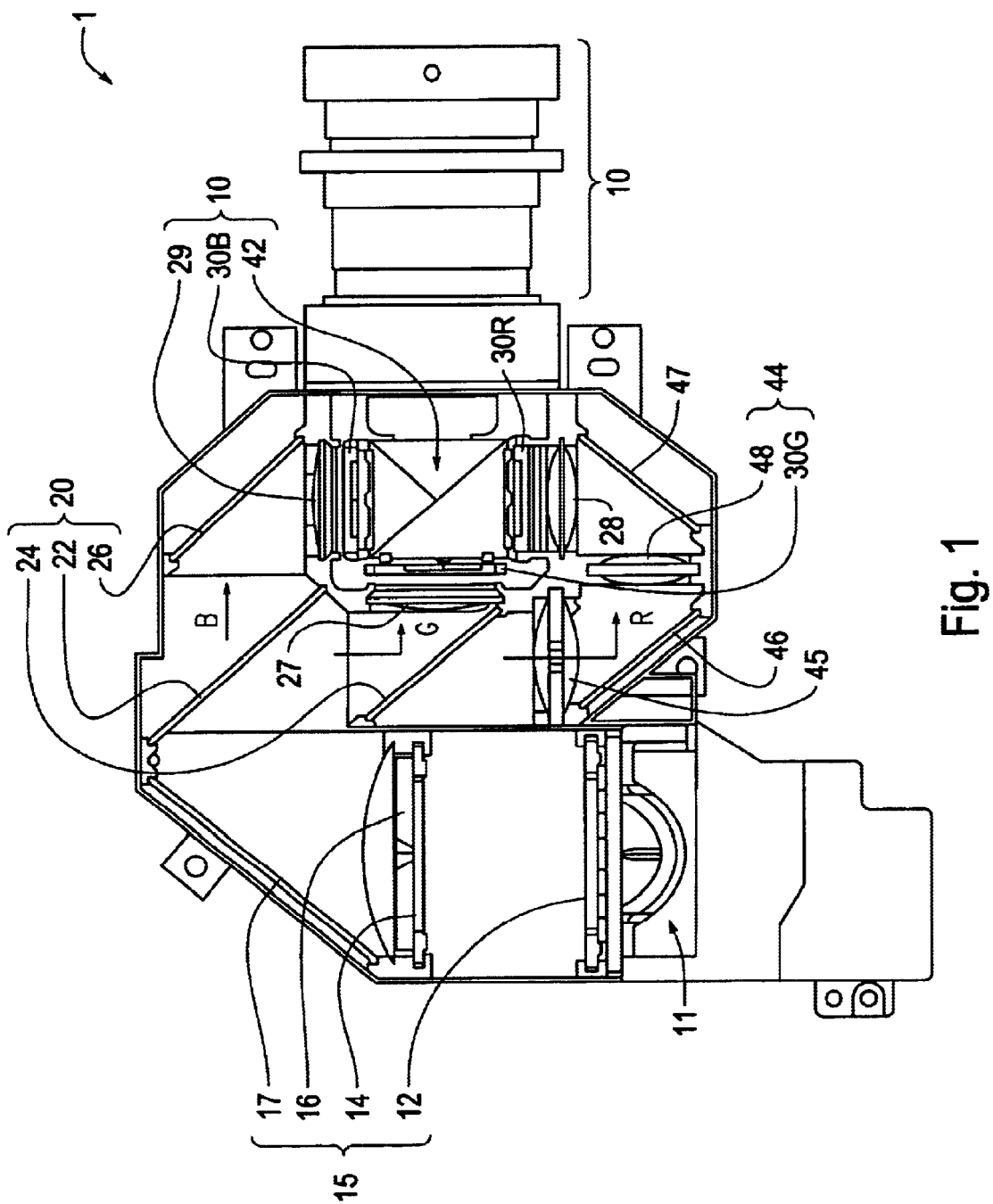
FIG. 1 is a plan view showing the optical system of the projection type device using the electronic optical device according to the present invention as a light valve.

The embodiments of the present invention will be described referring to the drawings.

Construction of the main parts of the projection type device will now be described. The optical system built in the optical unit of the projection type device will be described referring to FIG. 1. An optical unit 10 is mounted in the housing of the projection type device 1, the optical unit 10 including a light source lamp 11 (a light source), integrator lenses 12 and 14 comprising an assembly of small lenses, an illumination optical system 15 provided with a polarization separator 16 comprising an assembly of polarization separating films and λ/4 phase plates, a spectrophotometric optical system 20 for separating white light flux projected from the illumination optical system 15 into each color flux R (red), G (green) and B (blue), three liquid crystal light valves 30R, 30G and 30B as light valves for modulating each color light flux, a prism unit 42 comprising a dichroic prism as a color synthesis optical system for recombining the modulated color light flux, and a projection lens unit 50 (projection optical system) for projecting the synthesized flux with magnification onto a screen (not shown). A halogen lamp, metal halide lamp or xenon lamp can be used for the light source lamp 11. Since this optical unit 10 corresponds to the construction in which a λ/2 phase plate is disposed at the projection site of the P polarized light between P polarized light and S polarized light separated by each prism at the polarization separator 16, the light flux can be aligned to be S polarized light.

The illumination optical system 15 is provided with a reflecting mirror 17, so as to reflect the center of the optical axis of the illumination optical system 15 at a right angle toward the front direction of the device. A red light and green light reflecting dichroic mirror 22, a green light reflecting dichroic mirror 24 and a reflecting mirror 26 are disposed at the spectrophotometric optical system 20. The red light flux R and green light flux G included in the white light flux projected out of the light source lamp 11 are at first reflected, via the illumination optical system 15, at a right angle at the red light and green light reflecting dichroic mirror 22 toward the green light reflecting dichroic mirror 24. The green light flux is reflected, after passing through the red and green light reflecting dichroic mirror 22, at a right angle at the rear reflecting mirror 26 and projected out of the blue light flux projection part towards the prism unit 42. Only the green light flux G of the red and green light fluxes R and G reflected at the red and green light reflecting dichroic mirror 22 are reflected at a right angle at the green light reflecting dichroic mirror 24, which is projected out of the green light flux projection part towards the prism unit 42. On the contrary, the red light flux after passing through the green light reflecting dichroic mirror 24 is projected out of the red light flux projection part toward the light guide system 44. Light condensing lenses 27, 28 and 29 are disposed at each projection side of respective color flux in the spectrophotometric optical system 20. Accordingly, each light flux projected out of respective projection part is projected into each light condensing lens 27, 28 or 29, respectively, to be condensed in each liquid crystal light valve 30R, 30G and 30B. Thus, a light condensing system for condensing each light flux projected out of the light source lamp 11 to guide to each liquid crystal light valve 30R, 30G or 30B is composed of an illumination optical system 15, a spectrophotometric optical system 20, light condensing lenses 27, 28 and 29, and a light guide system 44.

The blue and green light fluxes B and G, among the light fluxes R, G or B condensed as described above, are modulated by being projected into the liquid crystal light valves 30R, 30G and 30B, being endowed with image information (display information) corresponding to each color light. In other words, these light valves are subjected to a switching control by an addressing means (not shown) corresponding to the image information, thereby modulating each color light passing through there. Conventional addressing means can be directly applied for such addressing means.

The red light flux R is also subjected to modulation there, on the other hand, depending on its image information after being guided by the liquid crystal light valve 30R through the light guide system 44. A light valve in which, for example, a polysilicon TFT is used for the switching element can be used as a light valve according to the present example. A projection side lens 45, a projection side reflecting mirror 46 and an intermediate lens 48 disposed between them are disposed as the light guide system 44.

The color light fluxes modulated through respective liquid crystal light valves 30R, 30G or 30B are projected into the prism unit 42, which are recombined there. The recombined color image is projected with magnification through the projection lens unit 50 onto a screen placed at a given position.

Figure 2:
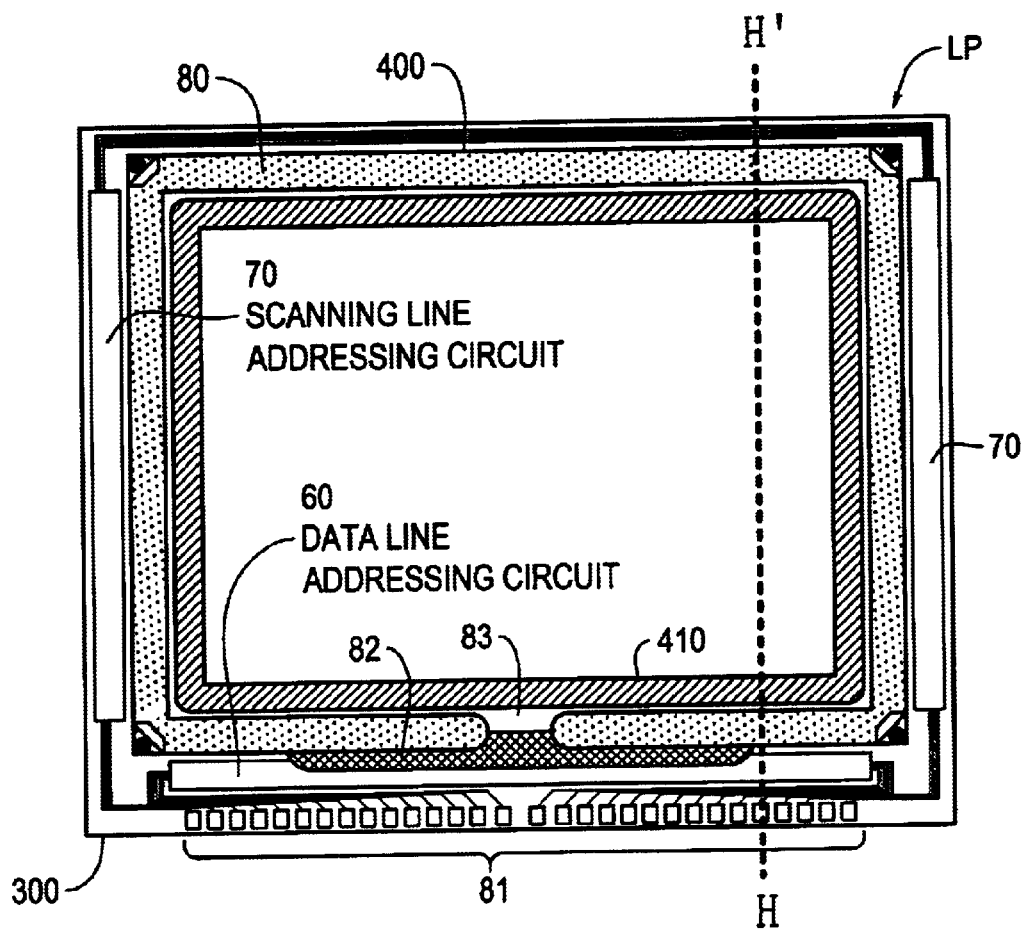
FIG. 2 is a plan view of the electronic optical device according to the present invention.
Figure 3:
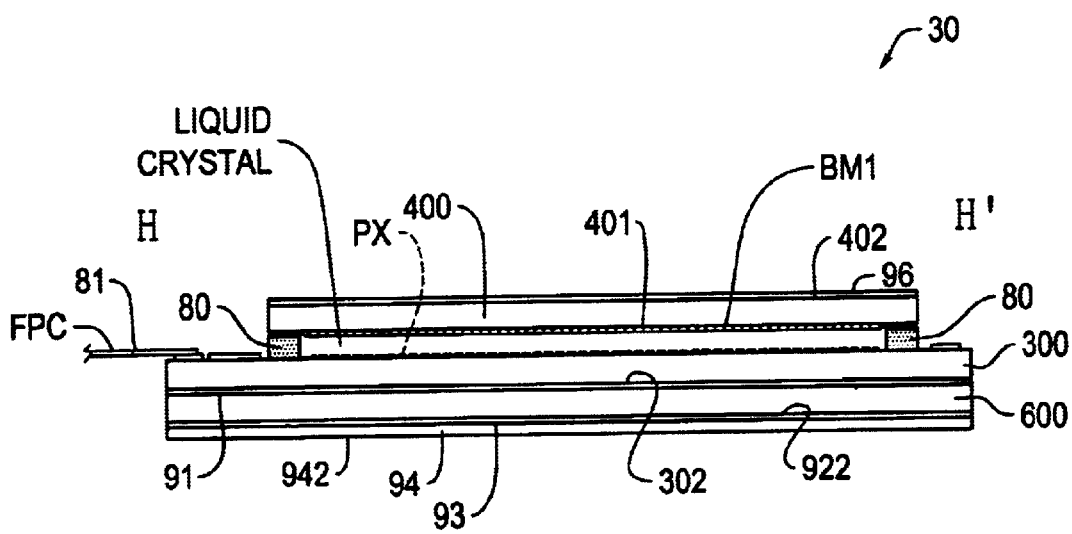
FIG. 3 is a cross section along the line H–H' in FIG. 2 showing a first embodiment with respect to the outer face side of the electronic optical device.
Figure 18:
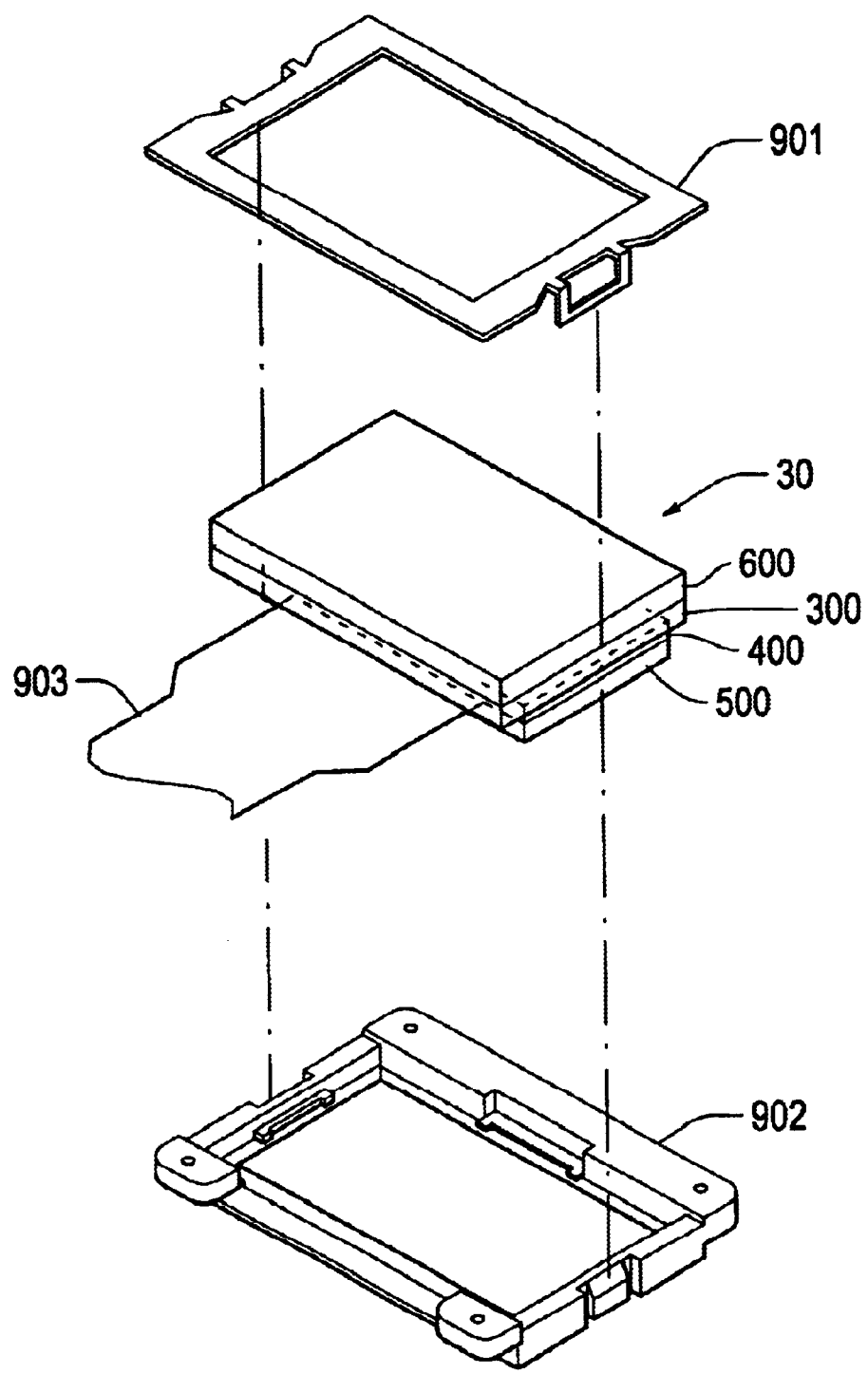
FIG. 18 is a disassembled perspective view of the electronic optical device and case according to the present invention.

Construction of the electronic optical device/liquid crystal light valve will now be described. All of the liquid crystal light valves 30R, 30G,and 30B have the constructions as a electronic optical device 30 as shown in FIG. 2 and FIG. 3, having an active matrix substrate 300 (the first transparent substrate), a transparent opposite substrate 400 (the second transparent substrate) provided with an opposite electrode 401 and a light-shielding film BM1 (a black mask). The active matrix substrate 300 and the opposite substrate 400 are bonded with each other via a given gap (a cell gap) with a seal layer 80 using a seal material containing a gap material, a liquid crystal (LC) being sealed into the space between the substrates. Epoxy resins or various kinds of ultraviolet light curing resins can be used for the seal layer 80, for example. Inorganic or organic fibers or balls with a dimension of about 2 $\mu$m to 10 $\mu$m can be used for the gap material. The opposite substrate 400 has a dimension smaller than the active matrix substrate 300, the periphery of the active matrix substrate 300 being bonded to the opposite substrate 400 so as to protrude out of the circumference of the opposite substrate 400. Accordingly, a flexible print wiring card (FPC) can be joined to input-output terminals 81 because the input-output terminals 81, a scanning line addressing circuit 60 and a data line addressing circuit 70 are situated outside of the opposite substrate 400. See FIG. 4(A). A liquid crystal injection port 83 may be provided at a cut-off portion where the seal layer 80 is not present. Therefore, the liquid crystal (LC) may be injected in vacuum through the liquid crystal injection port 83 when the interior area of the seal layer 80 is evacuated of air after bonding the opposite substrate 400 with the active matrix substrate 300. The liquid crystal injection port 83 may be plugged with a sealant 82 after the liquid crystal (LC) has been sealed. A light shielding film (the second light shielding film) 410 is also formed in the active matrix substrate 300 at the inside of the seal layer 80. A pair of the electronic optical devices having a flexible wiring card 903 is accommodated in a panel fixing frame 902 as a part of the case, which is so constructed as to be held by a holding plate 901 from above the electronic optical device as shown in the disassembled perspective view in FIG. 18.

Construction of the active matrix substrate and pixel part will now be described. The construction of the addressing circuit built-in type active matrix substrate 300 for use in the electronic optical device as described above is shown in FIG. 4(A) as a block diagram.

Figure 4A:
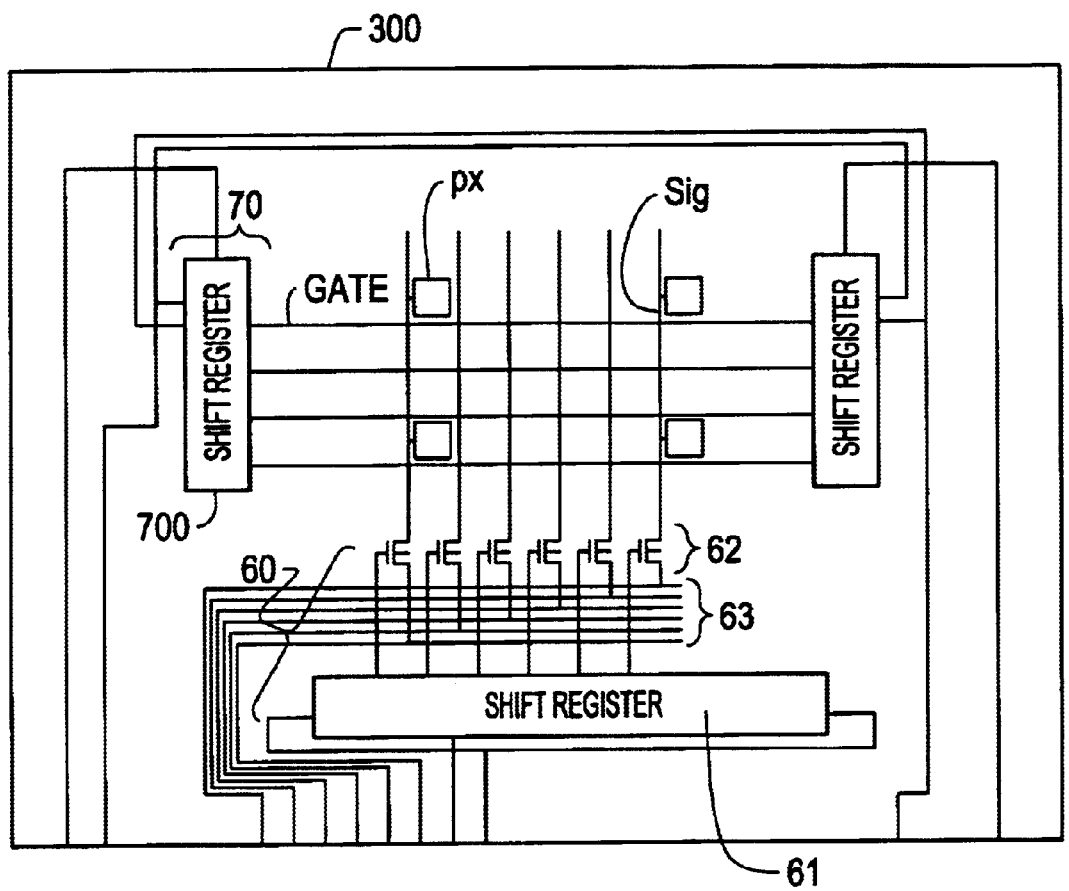
Figure 4B:
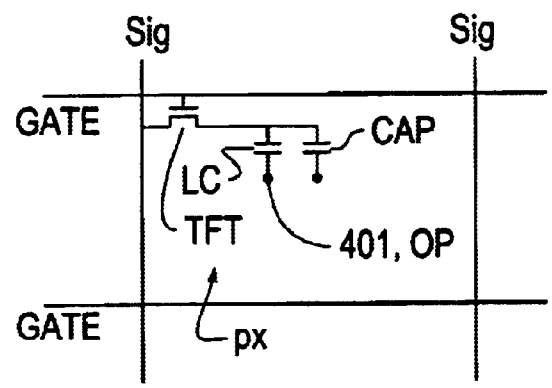
FIG. 4B is an enlarged block diagram of one of the pixel groups constructed in a matrix thereon.

As is evident from FIG. 4(A), a plurality of pixels are constructed as a matrix comprising a plurality of scanning lines gate and data lines sig on the transparent substrate (an active matrix substrate) 300. A thin film transistor TFT for use in pixel switching connected to the scanning lines gate and data lines sig is formed on each pixel area px as shown in FIG. 4(B) with magnification. The drain electrode of this thin film transistor TFT corresponds to a pixel electrode constructing the liquid crystal cell by inserting a liquid crystal (LC) between this electrode and the opposite electrode 401 of the foregoing opposite substrate 400. A capacitor cap is formed against the liquid crystal cell by taking advantage of the gate lines gate and capacitor lines (not shown in the drawing) in the foregoing pixel.

A data line addressing circuit 60 for supplying image signals to each of a plurality of data lines sig and a scanning line addressing circuit 70 provided with a shift registor 700 and buffer for supplying pixel selection scanning signals to each of a plurality of scanning lines gate are constructed at the periphery of the transparent substrate 300 in the active matrix substrate 300. The data line addressing circuit 60 is composed of a X-shift registor circuit 61 to which clock signals are supplied, a sample hold circuit 62 to be operated based on the signals supplied from the X-shift registor circuit 61, and six image signal lines 63 corresponding to each pixel electrode developed into six phases. Consequently, the sample hold circuit 62 is operated based on the signals supplied from the X-shift registor circuit 61, storing the image signals supplied via the image signal lines 63 with a given timing, thereby enabling to feed the image signals to each pixel px.

Construction of the outer face side of the electronic optical device will now be described. Although one of either the active matrix substrate 300 or the opposite substrate 400 is directed toward the light source lamp 11 (light source side) in FIG. 1 and the other substrate is directed toward the projection lens unit 50 (projection side) in FIG. 1, in the electronic optical device 30 so constructed as described previously, the opposite substrate 400 is directed toward the light source lamp 11 side (light source side) in FIG. 1 and the active matrix substrate 300 is directed toward the projection lens unit 50 side (projection side) in FIG. 1 in the following explanation.

A first embodiment with respect to the construction of the outer face side of the electronic optical device will be described hereinafter referring to FIG. 3 and FIG. 4(A).

The light from the light source lamp 11 is condensed so as to be focused on the liquid crystal (LC) in the electronic optical device 30 in FIG. 3. Accordingly, when the outer face 302 of the active matrix substrate 300 located in the vicinity of the liquid crystal (LC) is injured or contaminated with dust, these flaws and dust are also displayed on the projection image. Therefore, a third transparent substrate 600 having an approximately equal refractive index to the transparent substrate 300 is adhered with a plane surface on the outer face 302 of the active matrix substrate 300 with a transparent adhesive 91 having an approximately equal refractive index to the transparent substrate 300 as a substrate of the active matrix substrate in the present embodiment. In the electronic optical device 30 shown herein, a polarizer sheet 94 (polarizer) comprising an organic film is adhered with a plane surface on the outer face 922 of the third transparent substrate with a transparent adhesive 93, while a reflection preventing film 96 comprising a multilayer film of silicon oxide films and titanium oxide films is laminated on the outer face 402 of the opposite substrate 400. It is needless to say that the reflection preventing film is also formed on the outer face 922 of the third transparent substrate 600.

When the active matrix 300 is made of a transparent quartz substrate, the refractive index of the transparent quartz substrate may be higher than the refractive index of the third transparent substrate 600. The quartz substrate may have a refractive index of 1.46 as the second transparent substrate. A silicon based adhesive or an acrylic resin based adhesive prepared so as to have a refractive index of 1.46 may be used for the adhesive 91.

When the active matrix substrate 300 is made of a highly heat resistant glass with a refractive index of 1.54 such as Neoceram, a highly heat resistant glass plate of the same material can be naturally used for the third transparent substrate to match the refractive index of the substrate 300 with the refractive index of the third substrate 600. A silicon based adhesive or an acrylic resin based adhesive prepared so as to have a refractive index of 1.54 may be used for the adhesives 91 and 93.

A quartz substrate with a thickness of 1.1 mm and a quartz substrate with a thickness of 1.2 mm may be used for the opposite substrate 400 and transparent substrate forming the active matrix substrate 300, respectively, while a quartz substrate with a thickness of 1.2 mm may be used for the third transparent substrate 600 in the present embodiment. The thickness of the adhesives 91 and 93 may be in the range of 5 to 30 $\mu$m, preferably 10 $\mu$m or less, wherein the adhesive strength should be sufficiently high.

Since the transparent substrate 600 is made of any material which can reflect or absorb the ultraviolet rays of wavelength of 400 nm or less, it is possible to prevent the liquid crystal or an alignment film (not shown) from being damaged by the ultraviolet rays. Further, since the antirelfective film (not shown) is also made of any material which can reflect or absorb the ultraviolet rays of wavelength of 400 nm or less, it is possible to prevent the liquid crystal or an alignment film from being damaged by the ultraviolet rays.

Since the third transparent substrate 600 is adhered with its plane surface on the outer face 302 of the active matrix substrate 300 located in the vicinity of the liquid crystal (LC) in the electronic optical device 30 so constructed as described above, flaws and dust are never adhered on the outer face 302 of the active matrix substrate 300. A distance corresponding to the thickness of the third transparent substrate 600 is kept between the outer face 602 of the third transparent substrate or the surface 942 of the polarizer sheet 94 and the liquid crystal (LC). Consequently, the outer face 922 and the surface 942 of the polarizer sheet 94 are always de-focused. Therefore, flaws and dust are never displayed on the projection image even when flaws and dust are adhered on the outer face 922 of the transparent substrate prior to adhering the polarizer sheet 94. When dust is adhered on the surface of the polarizer sheet 94 after the polarizer sheet 94 has been adhered, these flaws and dust are also never displayed on the projection image.

No reflection boundary face is regarded to be present between the transparent substrate 600 and adhesive 91, and between the adhesive 91 and the third transparent substrate 600 because both of the adhesive 91 and the third transparent substrate 600 have an approximately equal refractive index to that of the active matrix substrate 300. For this reason, the light guided from the light source 11 efficiently transmits the electronic optical device 30 with very little luminous energy loss. Accordingly, the production cost is lowered since no reflection preventing film is required to be formed on the outer face 302 of the active matrix substrate 300 and on the face of the adhesive 91 and transparent substrate 600. The chance of the thin film transistor TFT malfunctioning because of the reflected light can be eliminated by the absence of light reflection in the electronic optical device 30 in the active matrix substrate 300. Moreover, since the adhesive 91 has an approximately equal refractive index to the transparent substrate 300 as a active matrix substrate 300, flaws on the outer face 302 of the transparent substrate 300, even when they are generated in the production process of the electronic optical device 30, are buried with the adhesive 91 used to repair them.

Figure 16:
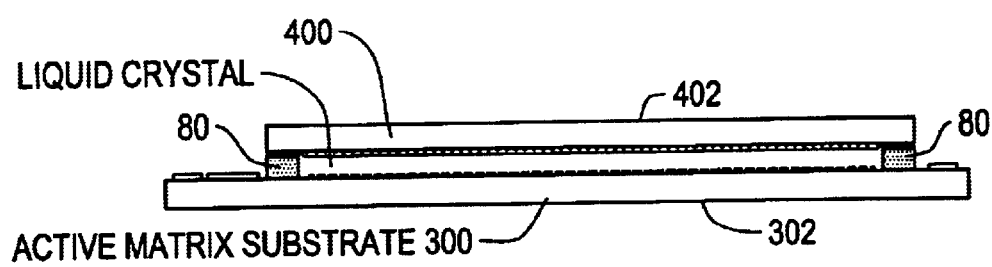
FIG. 16 is a cross section of a conventional electronic optical device.
Figure 17:
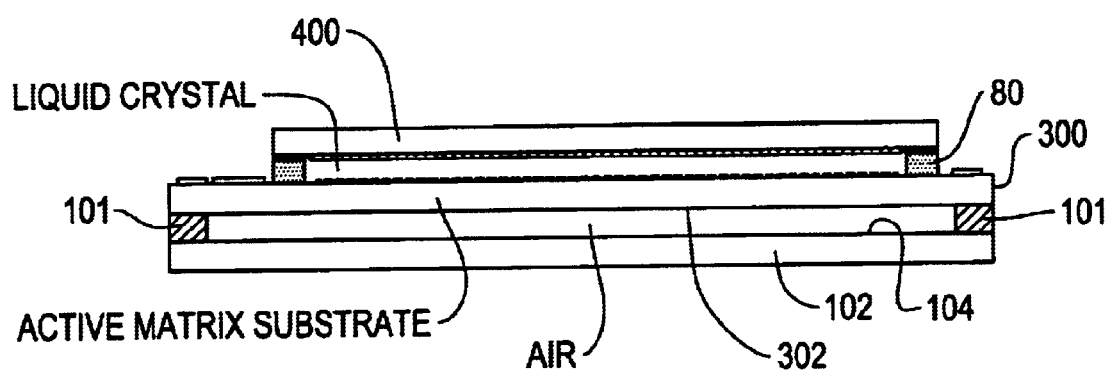
FIG. 17 is a cross section of a different conventional electronic optical device.

The electronic optical device 30 has a larger heat capacity as compared with the conventional electronic optical device shown in FIG. 16 because of the addition of the transparent substrate 600. Consequently, the temperature increase is small besides eliminating the partial temperature increase in the electronic optical device 30, thereby preventing distribution of the transmittance and deterioration of the liquid crystal (LC) because of the temperature difference.

When a silicon based adhesive, that is in a gel state after curing (an adhesive having elasticity), is used for the adhesive 91, stress occurring in curing the adhesive 91 can be relaxed by the elasticity of the adhesive 91 itself, thereby preventing strain from being generated in the transparent substrate in the electronic optical device 30.

A method for producing the electronic optical device will now be described. The method for producing the electronic optical device according to the first embodiment as described above will be described hereinafter referring to FIG. 5.

Figure 5:
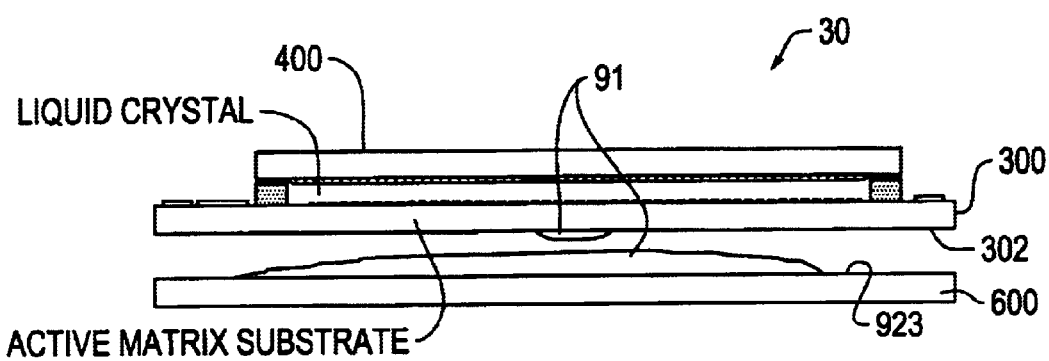
FIG. 5 is a cross section of the process for adhering the third transparent substrate with its plane in the production process of the electronic optical device shown in FIG. 3.

In the method for producing the electronic optical device 30 having the construction as hitherto described comprising the steps of adhering the third transparent substrate 600 on the outer face 302 of the active matrix substrate 300 as shown in FIG. 5, the adhesive 91 is dripped and coated on both of the inner face 923 of the third transparent substrate 600 and outer surface 302 (the outer face of the transparent substrate 300) of the active matrix substrate 300 on which a planar surface of the transparent substrate 600 is adhered, joining the two sheets of the transparent substrates 600 and 300 together by taking advantage of the adhesive 91 on both faces as a primary contact point and spreading the adhesive 91 between the two sheets of the transparent substrates 600 and 300 by pressing both sheets with each other and subsequently curing the adhesive 91. In the process of curing the adhesive, the adhesive is accurately cured by heating the adhesive under the condition of the temperature of 60 to 100 and the time of 2 hours to 5 hours.

Using such adhesion method can avoid deterioration of the image quality ascribed to air bubbles because no air bubbles remain in the adhesive 91 when the third transparent substrate 600 is adhered with the adhesive 91.

The adhesion step of the third transparent substrate 600 can be performed at any time either after assembling the electronic optical device 30 or before assembling the electronic optical device 30.

When the degree of penetration after curing the adhesive to be used herein is 90 or more, the adhesive flows out during the curing step of the adhesive, thus making it impossible to retain a proper amount of the adhesive on the transparent substrate. When the degree of penetration is less than 60, on the other hand, there arises a problem that a distortion remains between the substrates. Accordingly, it is preferable to use an adhesive whose degree of penetration after curing is larger than 60 and smaller than 90.

Figure 6:
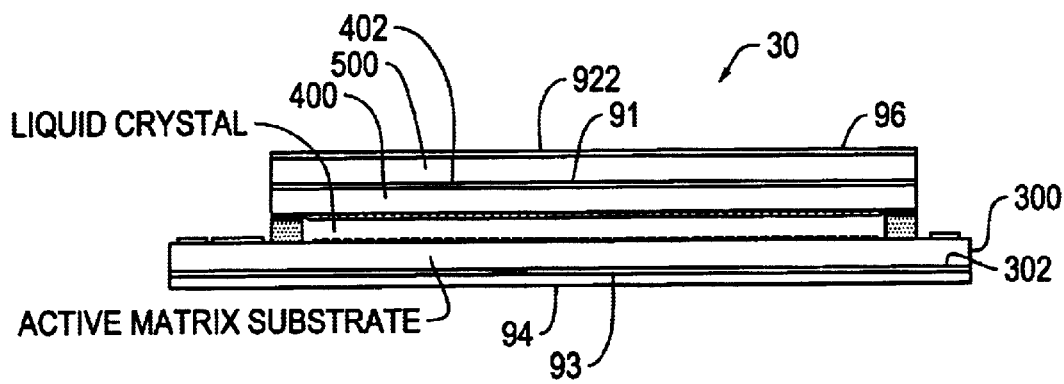
FIG. 6 is a cross section of the electronic optical device according to a modification to the electronic optical device shown in FIG. 3.

A first modification of the first embodiment with respect to the construction of the outer face side of the electronic optical device hitherto described will be described hereinafter referring to FIG. 6. Since the construction is almost the same as in the first embodiment, only the differences will be explained.

A third transparent substrate 500 having an approximately equal refractive index to the transparent substrate 300 may be adhered to the outer face 402 of the opposite substrate 400, instead of the outer face 302 of the active matrix substrate 300, with a silicon based or acrylic resin based transparent adhesive 91 having an approximately equal refractive index to the opposite substrate 400. A polarizer sheet 94 may be adhered on the outer face 302 of the active matrix substrate 300 with an adhesive 93 along with laminating a reflection preventive film 96 comprising a multi-layered film on the outer face 402 of the third transparent substrate 500 when the electronic optical device is so constructed as described above.

However, since the third transparent substrate 500 is adhered with its plane on the outer face 402 of the opposite substrate 400 in the electronic optical device 30 thus constructed, flaws and dust are never adhered on the outer face 402 of the opposite substrate 400. A distance corresponding to the thickness of the third transparent substrate 500 is also kept between the outer face 922 of the third transparent substrate and the liquid crystal (LC). Therefore, the outer face 922 of the third transparent substrate is always de-focused. Consequently, flaws and dust, even when they are adhered on the outer face 922 of the third transparent substrate, are never displayed on the projection image. The electronic optical device 30 has a larger heat capacity as compared with the conventional electronic optical device shown in FIG. 16 because of the addition of the transparent substrate 500. Accordingly, the electronic optical device 30 has a small temperature increase besides being free from a partial temperature increment, exhibiting the same effect as in the foregoing first embodiment for preventing distribution of the transmittance or deterioration of the liquid crystal (LC) because of the temperature difference.

The production method according to the first modification is the same as in the first embodiment, except that the adhesion side of the third transparent substrate 500 is reversed, i.e., it is upside down.

The second modification of the first embodiment with respect to the construction of the outer face side of the electronic optical device described above will be described hereinafter referring to FIG. 7. Since the second modification has a similar construction to the first embodiment, only the differences between them are described.

Figure 7:
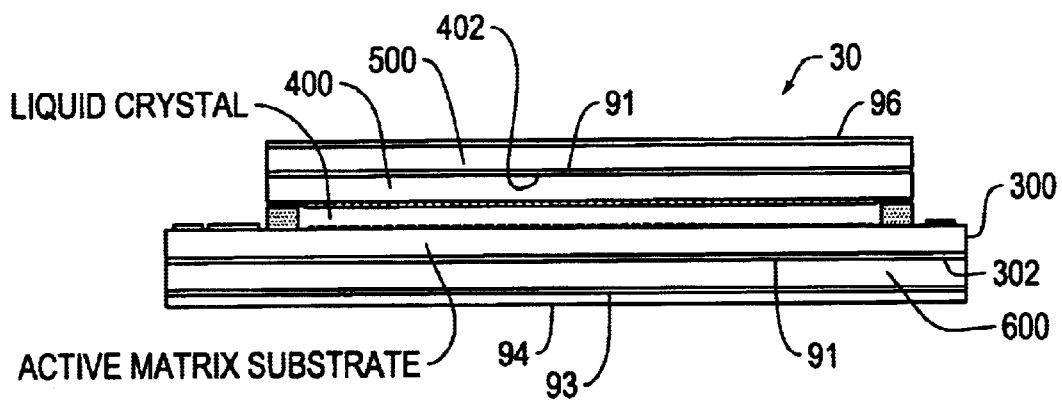
FIG. 7 is a cross section of the electronic optical device according to a modification to the electronic optical device shown in FIG. 3.

As shown in FIG. 7, the third transparent substrates 500 and 600 having an approximately equal refractive index to the opposite substrate 400 and active matrix substrate 300 may be adhered with their plane to the outer face 402 of the opposite substrate 400 and outer face 302 of the active matrix substrate 300 using an adhesive having an approximately equal refractive index to the opposite substrate 400 and active matrix substrate 300. A distance can be kept between the outer face 402 of the opposite substrate 400 or the outer face 302 of the active matrix substrate 300 and the liquid crystal (LC) when the electronic optical device is constructed as described above. Accordingly, since any of the outer face 922 of any of the transparent substrates is always de-focused, the same effect as described in the first embodiment—the display performance is never deteriorated when flaws and dust are adhered on these outer faces 922—is exhibited.

The electronic optical device 30 has a larger heat capacity because of the addition of the third transparent substrates 500 and 600. Accordingly, the electronic optical device 30 has a small temperature increase besides being free from a partial temperature increment, securely preventing distribution of the transmittance or deterioration of the liquid crystal (LC) because of the temperature difference.

The production method according to the second modification is the same as in the first embodiment, except that the third transparent substrates 500 and 600 are adhered to both the top and bottom faces.

The third modification of the first embodiment with respect to the construction of the outer face side of the electronic optical device hitherto described will be explained referring to FIG. 8, FIG. 9A and FIG. 9B. Since this modification has a similar construction to the first embodiment, only differences between them will be described. An adhesive may be injected in vacuum in any of the embodiments above by taking advantage of a seal material formed between the substrates to be adhered with their planes.

Figure 8:
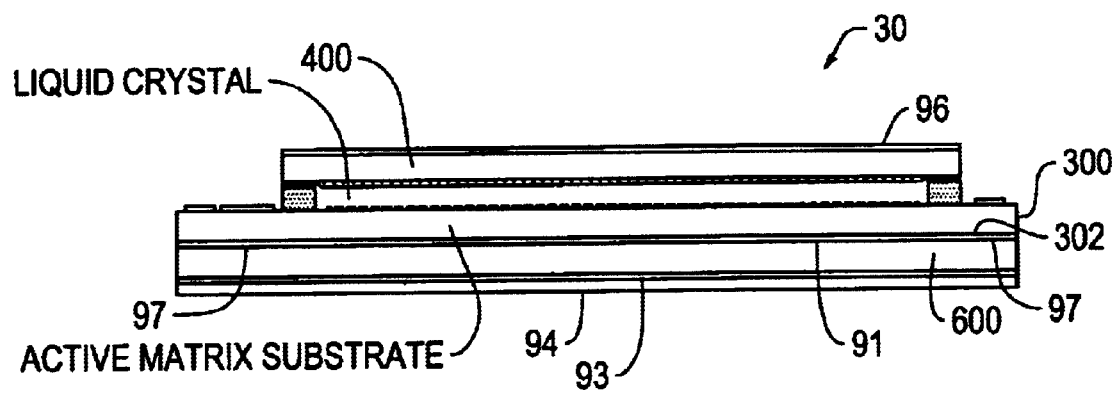
FIG. 8 is a cross section of the electronic optical device according to a modification to the electronic optical device shown in FIG. 3.
Figure 9A:
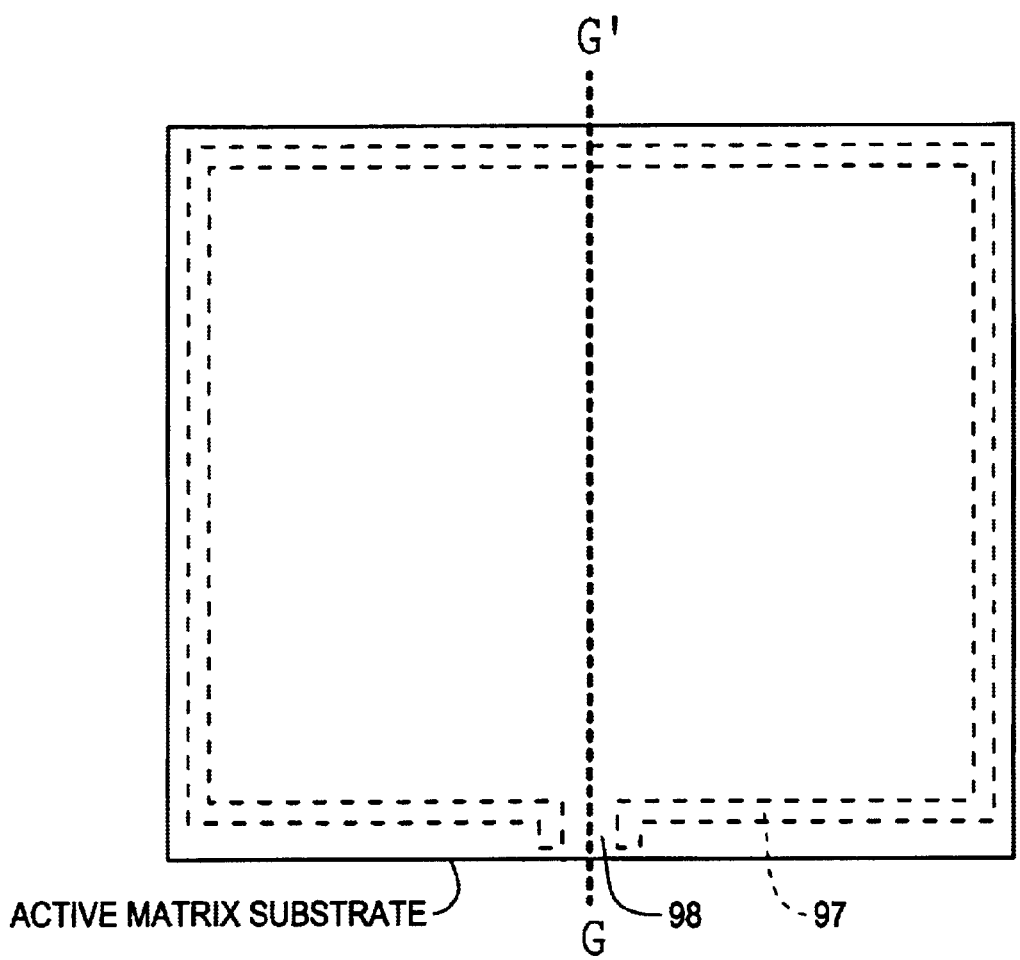
FIGS. 9A–9B are illustrative drawings of the process for injecting the adhesive between the transparent substrates in the production process of the electronic optical device shown in FIG. 8.
Figure 9B:
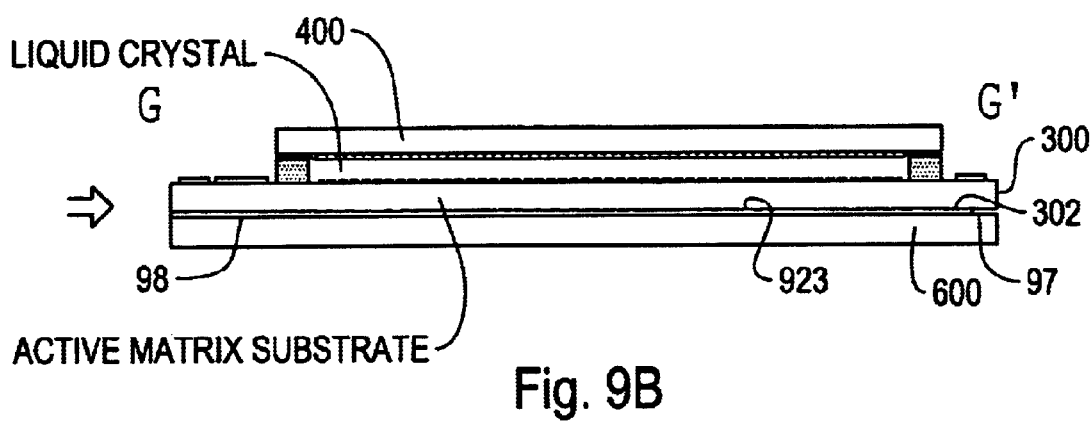

As shown in FIG. 8, FIG. 9A and FIG. 9B in the third modification, a seal material 97 comprising a ultraviolet light curing resin (such as an acrylic resin) is adhered on the inner face 923 of the transparent substrate 600 or on the outer face 302 of the active matrix substrate 300 on which the planar surface of the transparent substrate 600 is adhered, so that the periphery of the area to be coated with the adhesive 91 is surrounded with the seal material 97. Solid gap materials comprising inorganic or organic fibers or balls are previously added to the seal material 97 to make the thickness of the coated adhesive constant. The transparent substrate 600 is bonded to the active matrix substrate 300 with this seal material 97, curing the seal material 97 while the periphery of the area between the transparent substrate 600 and the active matrix substrate 300 to be coated with the adhesive 91 is surrounded with the seal material 97. For this purpose, a portion of the seal material 97 is cut off to serve as an adhesive injection port 98.

The adhesive 91 is injected from the adhesive injection port 98 into the area divided with the seal material 97 after evacuating the area of air, followed by curing the adhesive 91.

The adhesive injection port 98 may be plugged with a sealant before or after curing the adhesive 91, provided that the adhesive 91 has been injected.

No deterioration of the image quality is evident in the liquid crystal display so constructed even when the third transparent substrate 600 is adhered with the adhesive 91 because no air bubbles remain inside of the adhesive 91.

The second embodiment with respect to the construction of the outer face of the electronic optical device will be described hereinafter referring to FIG. 10A to FIG. 12 and FIG. 18. FIG. 10A to FIG. 10E illustrate an example applicable in the second embodiment, respectively, while FIG. 11A to FIG. 11E show each modification of them, respectively. FIG. 12 is an enlarged view of the portion where the electronic optical device and case makes a contact, and illustrates how to mount the display panel in the case. The constructions of the electronic optical device 30 and the case are the same as in FIG. 18, wherein the fixing frame 902 and the holding plate 901 are described to be included in the case 900 for the convenience of description in FIG. 12.

The electronic optical device according to the second embodiment shown in FIG. 10A to FIG. 10E, respectively, is constructed by adhering the first transparent substrate (an active matrix substrate) 300, on the display area of which pixel electrodes and pixel switching elements are formed, and the second transparent substrate (an opposite substrate) 400 disposed in opposing relation to the first transparent substrate 300 with a seal material 80, the liquid crystal being disposed between the first transparent substrate 300 and the second transparent substrate 400. A light-shielding second partitioning periphery 410, which defines the display area, is provided on the second transparent substrate 400. Specifically, the second partitioning periphery 410 is provided at the area from the contours of the display area to the area surrounding the display area inside of the seal material forming area without being overlapped with the seal material forming area of the second transparent substrate 400 as shown in the enlarged view of FIG. 12. Accordingly, the first transparent substrate 300 and the second transparent substrate 400 can be well adhered with each other via an area spaced from the edge of the second transparent substrate 400 using a ultraviolet light curing adhesive.

Figure 10A:
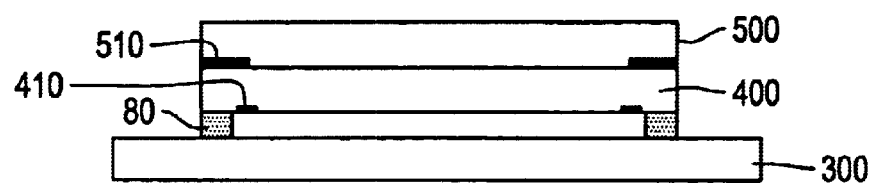
FIGS. 10A–10E are cross section of each example adoptable in a second embodiment with respect to the outer face side of the electronic optical device according to the present invention.

In the example shown in FIG. 10A, the third transparent substrate 500 is provided at the outer face side of the second transparent substrate 400 while the light-shielding first partitioning periphery 510 defining the display area is formed on the third transparent substrate 500.

Figure 10B:
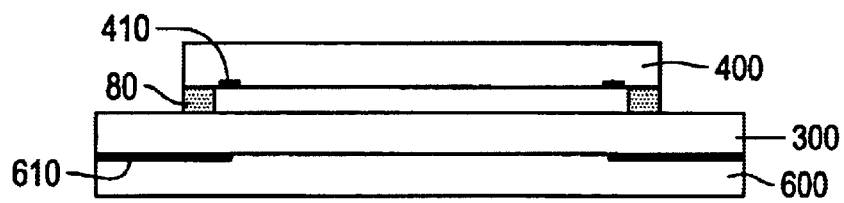

In the example shown in FIG. 10B, the third transparent substrate 600 is provided at the outer face side of the first transparent substrate 300 while the light-shielding first partitioning periphery 610 defining the display area is formed on the third transparent substrate 600.

Figure 10C:
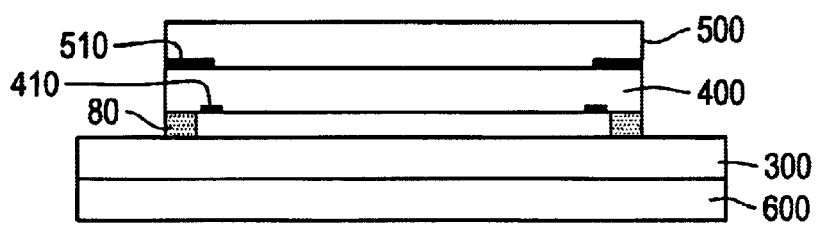

In the example shown in FIG. 10C, the third transparent substrate 600 is provided at the outer face side of the first transparent substrate 300 and the third transparent substrate 500 is provided at the outer face side of the second transparent substrate 400, while the light-shielding first partitioning periphery 510 defining the display area is formed on the third transparent substrate 500.

Figure 10D:
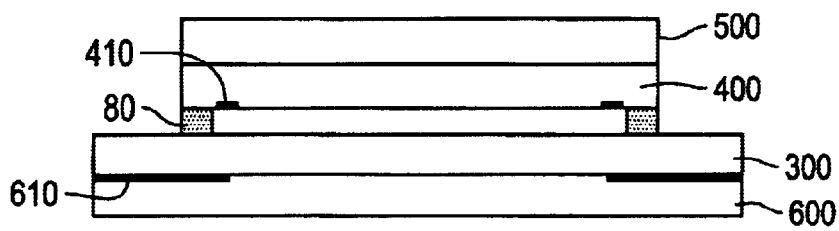

In the example shown in FIG. 10D, the third transparent substrate 600 is provided at the outer face side of the first transparent substrate 300, while the light-shielding first partitioning periphery 610 defining the display area is formed on the third transparent substrate 600, and the third transparent substrate 500 is provided at the outer face side of the second transparent substrate 400.

Figure 10E:
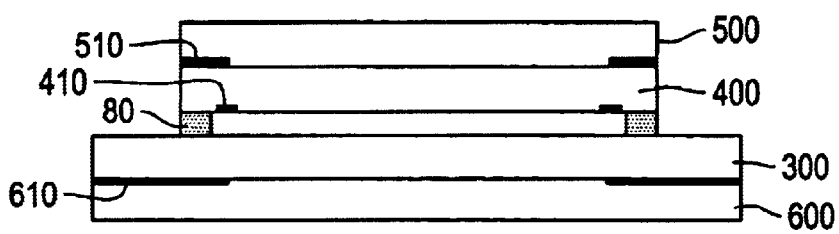

In the example shown in FIG. 10E, the third transparent substrate 600 is provided at the outer face side of the first transparent substrate 300 and the light-shielding first partitioning periphery 610 defining the display area is formed on the third transparent substrate 600, while the third transparent substrate 500 is provided at the outer face side of the second transparent substrate 400 and the first partitioning periphery 510 defining the display area is formed on the third transparent substrate 500.

According to the second embodiment shown in FIG. 10A to FIG. 10E, respectively, the dust preventing function is enhanced because the third transparent substrate 500 or 600 is provided at the outer face side of the second transparent substrate 400 or the first transparent substrate 300. The de-focusing fraction against dust and flaws adhered on the third transparent substrate 500 or 600 is also improved in correspondence with the thickness of the third transparent substrate 500 or 600. The de-focusing function becomes higher as the third transparent substrate 500 or 600 is thicker. For example, when the third transparent substrate 500 or 600 is formed of a quartz substrate, glass plate or plastic plate having a thickness of 1.0 mm or more, the de-focusing fiction at the third transparent substrate 500 or 600 can be sufficiently high. Consequently, the image of the dust and flaws adhered on the outer face of the third transparent substrate 500 or 600 can be blurred so as not to be visually recognizable.

The light-shielding first partitioning periphery 510 or 610 defining the display area is provided on the third transparent substrate 500 or 600. The light-shielding first partitioning periphery 510 or 610 is provided so as to be overlapped with the second partitioning periphery 410 in a plane. The light-shielding first partitioning periphery 510 or 610 is different from the partitioning periphery of the conventional electronic optical device in that it can be provided on the third transparent substrate 500 or 600 from the contours of the display area until the edge of the third transparent substrate 500 or 600. In other words, the partitioning periphery thus provided does not interfere with ultraviolet light irradiation for curing the ultraviolet light curing resin in the seal area adhered with the seal material 80, because adhesion of the first transparent substrate 300 and second transparent substrate 400 have already been completed before attaching the third transparent substrate 500 or 600 in the production process of the electronic optical device according to the present invention. In other words, the first partitioning periphery 510 or 610 is disposed so that the display area side edge of it may position nearer to the peripheral side than the position of the effective display area side edge of the second partitioning periphery 410. Namely, the edge of the display area side of the first partitioning periphery 510 or 610 is disposed more outer side than the edge of the display area side of the second partitioning periphery 410. The first partitioning periphery 510 or 610 and the second partitioning periphery 410 are provided so as to be overlapped at least partly each other, in plain state. Such construction, in which the first partitioning periphery and the second partitioning periphery are overlapped with each other, makes it possible to perform the light-shielding at the periphery of the display area, more surely.

The manufacturing method according to the present embodiment comprises the following steps: Forming the second partitioning periphery either on the first transparent substrate 300 or on the second transparent substrate 400. Then, providing the seal material, which comprises ultraviolet light curing resin, on either the first transparent substrate 300 or the second transparent substrate 400 so that the seal material and the second partitioning periphery may not be overlapped each other and the position of the seal material may be more outer side than that of the second partitioning periphery relative to the display area. Next, after adhering the first transparent substrate to the second transparent substrate, exposing them to the ultraviolet rays for curing the seal materials. While, on the third transparent substrate, the first partitioning periphery is provided so that the first partitioning periphery and the second partitioning periphery (second light-shielding film) may be overlapped together and the position of the first partitioning periphery may be nearer to the outer side than that of the second partitioning periphery (second light-shielding film) relative to the display area. Then, disposing the third transparent substrate equipped with the first partitioning periphery so that it may be overlapped with the outer face side of at least either the first transparent substrate 300 or the second transparent substrate 400. In this case, it is also possible to make a surface-adhering between the third transparent substrate and either the first transparent substrate 300 or the second transparent substrate 400, like the manufacturing method described in the first embodiment. Different from the above mentioned case, namely the partitioning periphery built in a conventional liquid crystal apparatus, this construction enables the first partitioning periphery 510 or 610 to be provided on the third transparent substrate 500 or 600 from the periphery of the display area to the edge of the third transparent substrate 500 or 600. It means that the first partitioning periphery formed on the third transparent substrate does not obstruct the ultraviolet light irradiation for the hardening of the ultraviolet light curing resin, since the third transparent substrate is arranged after adhering the first transparent substrate 300 to the second transparent substrate 400 by seal material 80. Therefore, according to the above mentioned manufacturing method, the second partitioning periphery can be formed so fine that the seal material is hardened, sufficiently. Further, if the first partitioning periphery is formed so that it may be overlapped with the second partitioning periphery in plain state, and is also formed as extensive as possible around the display area, the light-shielding at the peripheral of the display area is performed, well enough.

Besides, there is another manufacturing method that, after adhering the first transparent substrate 300 to the second transparent substrate 400 by seal material, the first partitioning periphery is disposed on the third transparent substrate, wherein the thickness of the first partitioning periphery, 5 to 30 m is set so as to correspond to the thickness of the adhering material, and, some broken parts are provided with the first partitioning periphery. Next, after confronting the outer face side of either the first transparent substrate or the second transparent substrate, and the third transparent substrate so that the first partitioning periphery may be sandwiched with the either the first transparent substrate or the second transparent substrate, and the third transparent, the adhering material is injected from the broken part. Then, the adhering material is hardened. According to this construction, it is possible to make the first partitioning periphery operate to be not only as a light-shielding means but also a stopper for preventing the adhering material from flowing out. The design margin of the opening of the case 900 shown in FIG. 12 can be enlarged corresponding to the enlarged width of the first partitioning periphery 510 or 610 because the width of the first partitioning periphery 510 or 610 can be expanded as shown previously. For example, when no first partitioning periphery 510 or 610 is provided as in the foregoing conventional examples, the design margin of the opening becomes equal to the width of the partitioning periphery 410, which is represented by $W_0$ in FIG. 12, provided on the second transparent substrate 400, so that the case 900 must be produced to accommodate the edge of the opening within this width. It is very difficult in the production process to fit the edge of the opening to the built-in partitioning periphery 410 with such a narrow width since this case 900 is made of, for example, a plastic that tends to generate burrs, resulting in a high production cost. According to the embodiments of the present invention, however, since the width $W_2$ or $W_1$ of the first partitioning periphery 510 or 610 can be directly used for the design margin of the opening of the case 900 as shown in FIG. 12, it becomes far easier to fit the edge of the opening to the partitioning periphery 510 or 610 in the production process even when the case 900 is made of a plastic material that tends to generate burrs, making it possible to lower the production cost. Namely, the edge of the display area side of the case is disposed more outer side than the edge of the display area side of the first partitioning periphery 510 or 610, and the first partitioning periphery 510 or 610 is overlapped with the case in plain state.

It is possible to form the first partitioning periphery 510 or 610 up to the edge of the first transparent substrate 400 without forming the second partitioning periphery 410 up to the edge, thereby allowing the design margin of the opening of the case 900 to be enlarged by the first partitioning periphery 510 or 610 irrespective of the position and width of the second partitioning periphery 410.

Moreover, since the first partitioning periphery 510 or 610 is provided, the light-shielding performance in the vicinity of the edge can be improved when the electronic optical device is used in the projection type display device such as a liquid crystal projector or for the transmission type display device using a back light as illustrated in FIG. 1. Consequently, it is made possible to prevent ghost images of auxiliary circuits and elements in the foregoing panel, thereby enabling display with a high image quality.

The first partitioning periphery 510 or 610 is specifically provided in the entire area surrounding the display area from the contours of the display area up to the edge of the third transparent substrate 500 or 600, as shown in FIG. 12. Accordingly, the width $W_2$ or $W_1$ of the first partitioning periphery 510 or 610 can be obtained by utilizing the face of the third transparent substrate 500 or 600 as much as possible. Therefore, the design margin of the case opening can be enlarged to its maximum because of the enlargement of the width $W_2$ or $W_1$. Furthermore, the effect for preventing ghost images of the auxiliary circuits and elements in the panel is much more improved as a result of specifically enhancing the light-shielding performance at the edge of the electronic optical device.

The overall heat capacity of the electronic optical device is increased because of the third transparent substrate 500 or 600, as in the first embodiment. A large heat capacity, sufficient for practical use, is obtained by adjusting the thickness of the third transparent substrate 500 or 600 to 1.0 mm or more. In addition, the presence of the light-shielding partitioning periphery 510 or 610 allows the temperature increase due to the incident light in the electronic optical device to be suppressed.

The first partitioning periphery 510 or 610 may be formed of a light-reflecting film such as Al (aluminum) or Cr (chromium), or a light absorbing film such as a registor resin having a reflection ratio of 20% or less. The partitioning periphery formed of a light-absorbing film prevents excess reflection light from irradiating.

At least the outer face side of the first partitioning periphery 510 or 610 may be constructed with a light-reflecting film having an OD value of, for example, 2 or more especially in the second embodiment. Such construction allows the temperature increase of the electronic optical device due to the incident light to be more effectively suppressed, compared with the case when no first partitioning periphery is provided on the third transparent substrate 500 or 600, since the incident light from outside of the third transparent substrate 500 or 600 into the peripheral area of the electronic optical device is reflected, and also the first partitioning periphery 510 or 610 serves as a light-shielding film. The reflected light can be re-used by reflecting it at the light source side again.

Figure 11A:
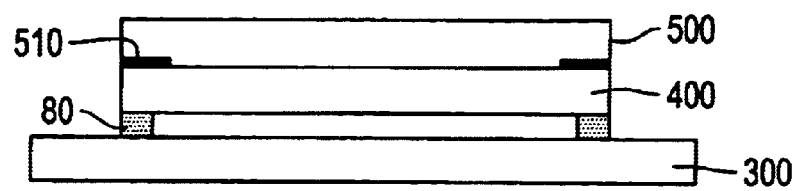
FIGS. 11A–11E are cross section of the electronic optical device showing each modification of the second embodiment.
Figure 11B:
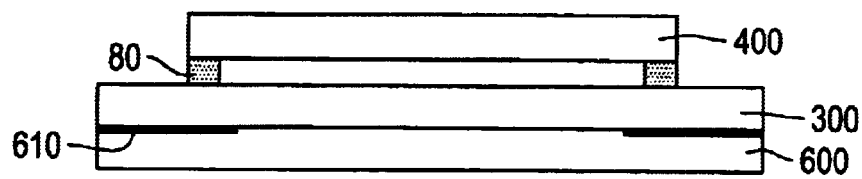
Figure 12:
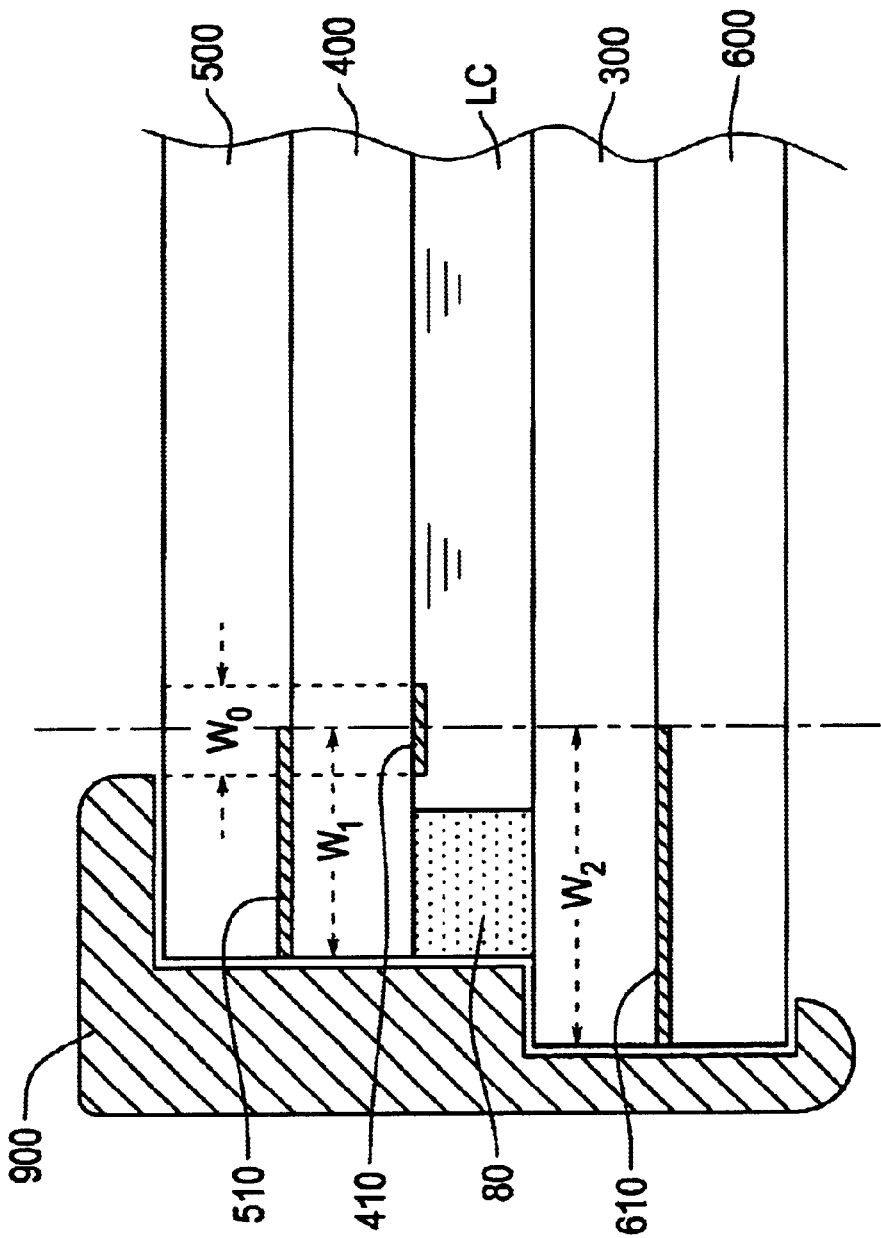
FIG. 12 is an enlarged cross section of the portion where the electronic optical device according to the first embodiment makes a contact with the case.

The second partitioning periphery 410 may be omitted as shown in FIG. 11A or FIG. 11B as a modification. The display area can be also defined by the first partitioning periphery 510 or 610 in the construction as described above. Accordingly, the production steps can be reduced while lowering the production cost by not forming the second partitioning periphery 410 in these modifications.

Providing the first partitioning periphery 510 or 610 at the side facing the first transparent substrate 300 or the second transparent substrate 400, as shown in FIG. 10A to FIG. 10E, is advantageous in that no corrosion or deterioration problems occur, even when the partitioning periphery is constructed with a metallic light-shielding film, since the partitioning periphery is only slightly exposed.

Figure 11C:
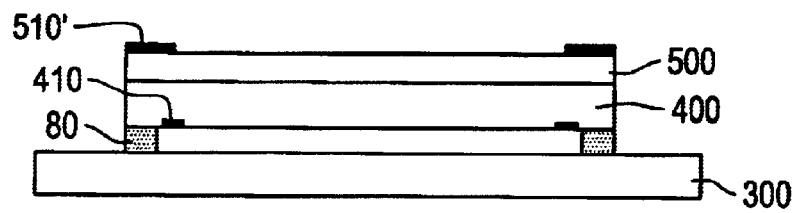
Figure 11D:
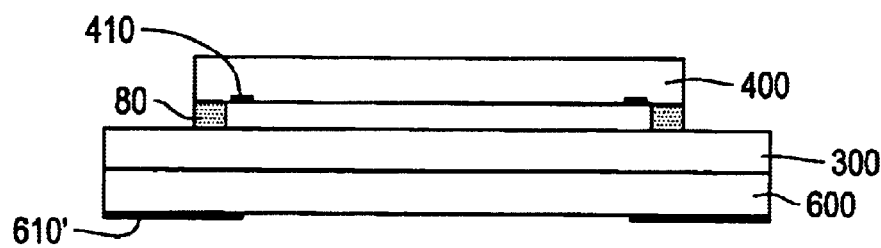

When the first partitioning periphery 510' or 610' is provided at the outer face side of the third transparent substrate 500 or 600, as shown in FIG. 11C or FIG. 11D as a modification, the inherent function of the partitioning periphery to define the display area can be improved.

The electronic optical device according to the present embodiment is mounted in the light-shielding case 900 that has an opening corresponding to the first partitioning periphery 510 or 610, as shown in FIG. 12. Problems such as the display area being hidden behind the edge of the opening of the case 900, or the portion of the panel out of the display area at the circumference of the second partitioning periphery 410 being visible from the opening, can be avoided even when a case 900 with a relatively poor dimensional accuracy is produced using an inexpensive material such as a plastic, because the design margin of the opening of the case 900 is expanded more than the conventional example, or the design margins of the panel fixing frame 902 and the opening of the holding plate 901 shown in FIG. 18 can be expanded, in the present embodiment.

It is preferable in the present embodiment, from the perspective of reducing the boundary reflection, that the third transparent substrate 500 or 600, and the first transparent substrate 300 or the second transparent substrate 400 in the adjoining relation to the former, are constructed with materials that have an approximately equal refractive index with each other. It is also preferable in the present embodiment, from the perspective of reducing the boundary reflection, that the third transparent substrate is adhered with an adhesive that has an approximately equal refractive index to those of the substrates above.

Figure 11E:
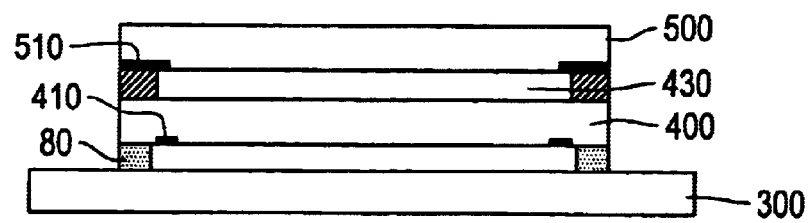

However, a gap may be provided between the third transparent substrate 500 or 600 and the first transparent substrate 300 or the second transparent substrate 400 in adjoining relation to the former, as shown in FIG. 11E. Such construction allows the temperature increase, especially in the vicinity of the liquid crystal (LC), to be suppressed because heat may be radiated from the liquid crystal (LC) and from the first transparent substrate 300 and the second transparent substrate 400 via the gap to the third transparent substrate 500 or 600.

Otherwise, the third transparent substrate 500 or 600 may be integrated with the first transparent substrate 300 and the second transparent substrate 400 by accommodating them in one case without adhering them with each other.

As described above, the electronic optical device according to the second embodiment provides an excellent dust-preventing function, de-focusing function, heat-radiating function and ghost image preventing fiction, along with reducing the production cost by expanding the margin of the case opening. Accordingly, a liquid crystal projector that displays a high quality image can be realized with a relatively low production cost when the electronic optical device according to the second embodiment is used in the liquid crystal projector (refer to FIG. 1), as described previously.

Figure 13:
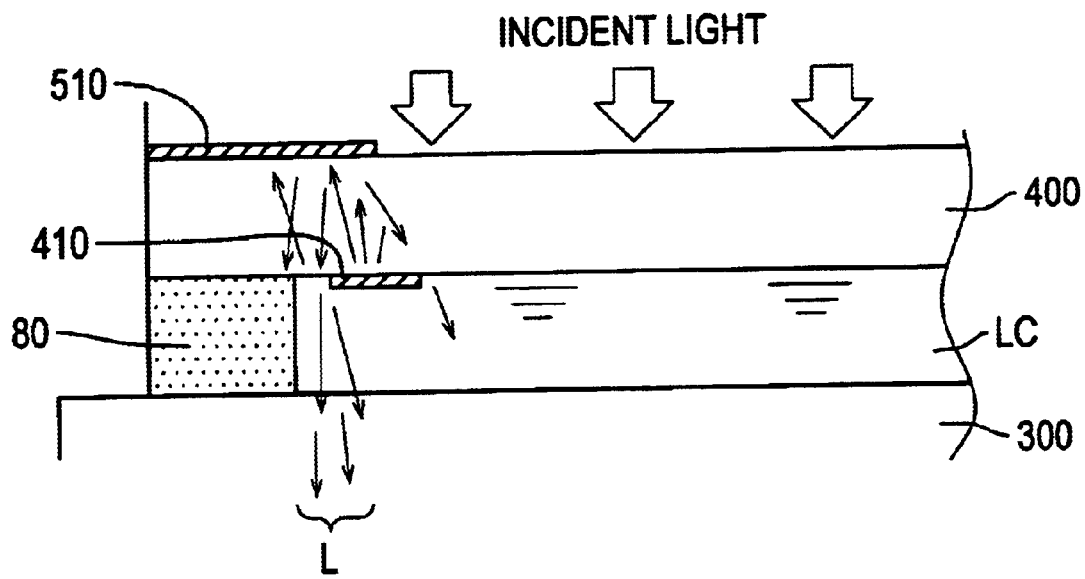
FIG. 13 is an enlarged cross section of the edge portion of the electronic optical device for illustrating the possible problems caused by the projection angle of the incident light in the construction according to the second embodiment.
Figure 14:
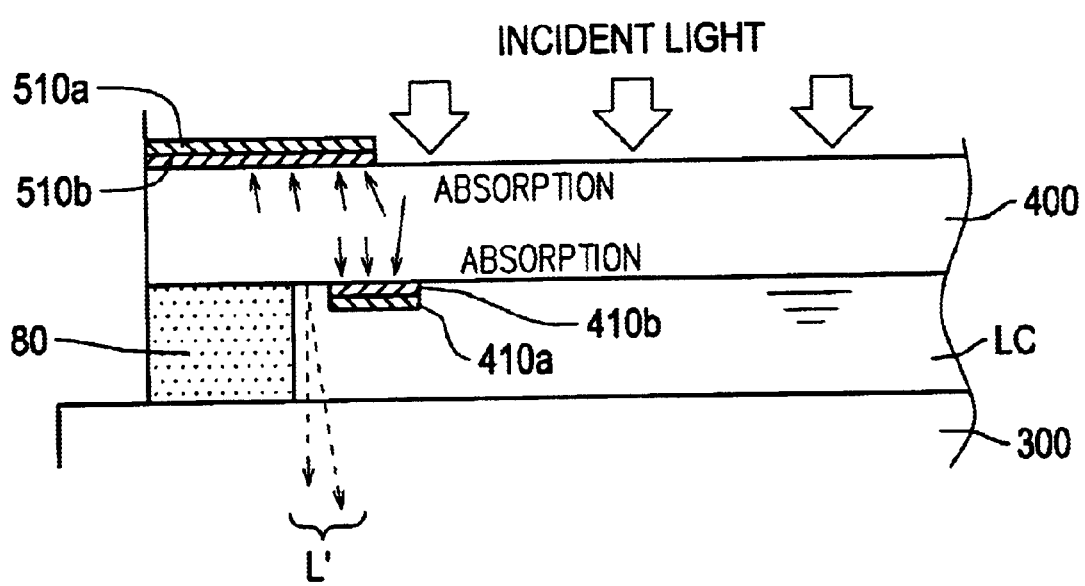
FIG. 14 is an enlarged cross section of the edge portion of the electronic optical device according to a third embodiment with respect to the construction of the outer face side of the electronic optical device according to the present invention.

The third embodiment with respect to the construction of the outer face side of the electronic optical device will be described hereinafter referring to FIG. 13 and FIG. 14. An enlarged cross section of the edge portion of the electronic optical device is shown in FIG. 13 as a construction in the second embodiment in order to elucidate possible problems depending on projection angles and intensity of the incident light. FIG. 14 is an enlarged cross section at the edge portion of the electronic optical device according to the third embodiment.

In the foregoing construction according to the second embodiment shown in FIG. 13, the incident light, which has been projected into the display area via the opening of the case 900 and then reflected by the second partitioning periphery 410, may possibly be projected into the liquid crystal (LC) as a multiple reflection light L by being reflected again by the first partitioning periphery 510 depending on the projection angle and intensity of the incident light. This multiple reflection light L finally causes deterioration of the image quality by being mixed with the projecting light.

Accordingly, the third embodiment is so constructed as not to allow the multiple reflection light to be generated by the partitioning periphery.

As shown in FIG. 14, the first partitioning periphery 510 includes two structures, including at least the film 510b at the inner face side, which is formed of a light absorption film with an OD value of 2 or more. The first partitioning periphery 510 also includes the film 510a at the outer side face, which may be similarly formed of the light absorbing film or be formed of the light-reflection film for the purpose of suppressing temperature increase. Such construction allows the first partitioning periphery 510 (510a and 510b) to function as a light-shielding film along with absorbing the reflected light or multiple reflection light L' in the panel generated by allowing the incident light to be reflected by the second transparent substrate 400 and second partitioning periphery 410. Therefore, the case where such reflected light and multiple reflection light L' adversely affect the image quality by being projected out of the electronic optical device can be prevented in advance.

It is impossible to absorb such multiple reflection light even when the first partitioning periphery 510 is formed of a light absorbing film with a single layer structure. Otherwise, the inner face side of the first partitioning periphery may be formed of a double layer structure or the entire layer may be formed of a light-absorbing film as well.

As shown in FIG. 14, the second partitioning periphery 410 may be formed of a double layer structure including an outer face side film 410b that is formed of a light absorbing-film with an OD value of 2 or more. The second partitioning periphery 410 also includes an inner side film 410a that may be, on the other hand, formed of a light-absorbing film as well. Such construction allows the second partitioning periphery 410 (410a and 410b) to function as a light-shielding film, along with preventing the reflected light and multiple reflection light L' from being generated in the panel by absorbing the incident light. Accordingly, the case where the multiple reflection light L' generated between the first partitioning periphery 510 (510a and 510b) and the second partitioning periphery 410 (410b) adversely affect the image quality can be prevented in advance.

Absorbing such multiple reflection light is possible when the second partitioning periphery 410 is formed of a light-absorbing film with a single layer structure. When the multiple reflection light caused by the incident light from the first transparent substrate 300 is prevented from being generated, on the other hand, the inner face side of the second partitioning periphery 410 may be formed of a light-absorbing film with a double layer structure or the entire partitioning periphery may be formed of a light-absorbing film.

According to the third embodiment as described above, problems, possibly caused by forming the first partitioning periphery 510 or 610 that is unique to the present invention, such as the multiple reflection light leaking through the periphery of the electronic optical device, can be prevented in advance by using a relatively simple construction, thereby realizing a electronic optical device that makes it possible to display a high quality image and that is highly reliable.

Figure 15A:
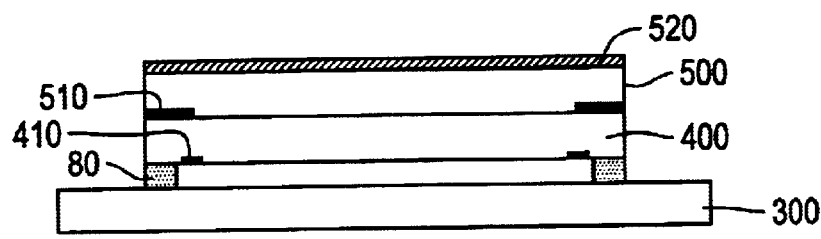
FIGS. 15A–15C are cross section adoptable in a fourth embodiment with respect to the construction of the outer face side of the electronic optical device according to the present invention.
Figure 15B:
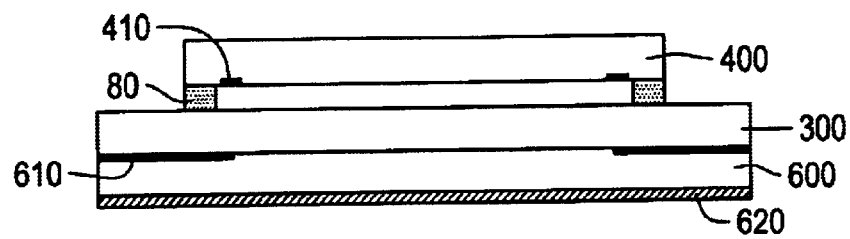
Figure 15C:
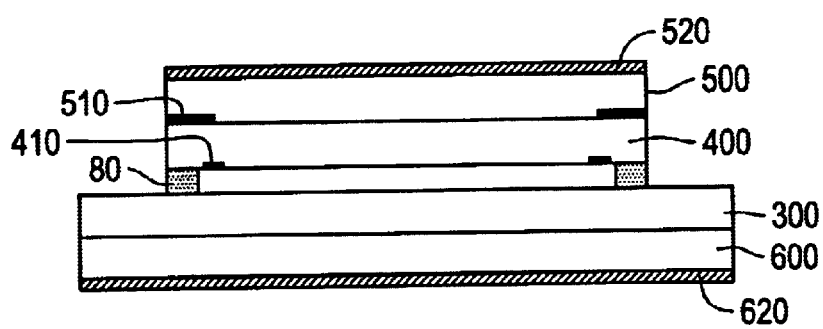

The fourth embodiment with respect to the construction of the outer face side of the liquid crystal will be described hereinafter referring to FIG. 15A to FIG. 15C. FIG. 15A to FIG. 15C show the construction applicable to the fourth embodiment. The same reference numerals refer to the same elements as in FIG. 10 and FIG. 11, and their descriptions are therefore omitted.

The electronic optical device according to the fourth embodiment shown in FIG. 15A to FIG. 15C, respectively, is constructed by providing with the first transparent substrate 300, second transparent substrate 400 and second partitioning periphery 410.

In the example shown in FIG. 15A, a reflection preventing film 520 is formed on the outer face of the third transparent substrate 500.

In the example shown in FIG. 15B, reflection preventing films 520 and 620 are formed on the outer face of the third transparent substrates 500 and 600.

In the example shown in FIG. 15C, reflection preventing films 520 and 620 are formed on the outer faces of the third transparent substrates 500 and 600.

The reflection preventing films 520 and 620 are formed, for example, by vacuum depositing a multi-layer film formed of silicon oxide and titanium oxide as in the first embodiment.

The construction as described above allows the incident light projecting into the outer face of the third transparent substrate 500 or 600 to be projected into the liquid crystal (LC) through the third transparent substrate 500 or 600 by being only slightly reflected by the reflection preventing film 520 or 620, thereby reducing the luminous energy loss in the display area along with making the display image luminous.

Therefore, there is no need for disposing the reflection preventing film and the like on the outer face side of the third transparent substrate 500 or 600 when mounting the electronic optical device according to the embodiment of the present invention in the case.

According to the fourth embodiment as described above, reflection on the outer surface of the third transparent substrate 500 or 600, unique to the present invention, can be prevented in advance by using a relatively simple structure, thereby realizing a electronic optical device that has a high quality image and that is highly reliable.

Figure 19:
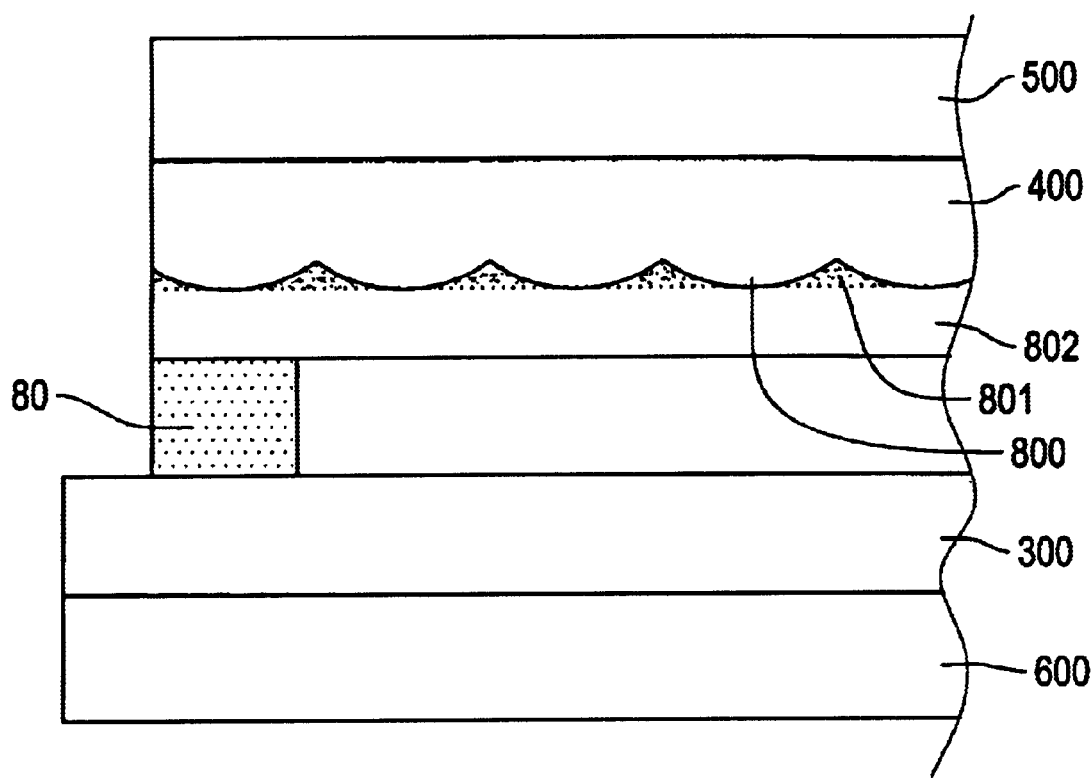
FIG. 19 is an enlarged cross section of the edge portion of the electronic optical device for illustrating the construction of a fifth embodiment.

The fifth embodiment will be described referring to FIG. 19. FIG. 19 is an enlarged cross section of the edge of the electronic optical device according to the fifth embodiment. Because the basic construction of the present embodiment is the same as the embodiment previously described, a detailed description is omitted and only the difference in the present embodiment will be elucidated. In the present embodiment, micro-lenses 800 are formed corresponding to pixel electrodes (not shown in the drawing) inside of the transparent substrate 400. Cover-glasses 802 are formed on the micro-lenses using an adhesive 801 for use in the micro-lenses. Either of the transparent substrates 500 or 600, or both of them, are formed on the outer face sides of the transparent substrate 300 and 400, as in the embodiment described above.

Forming the micro-lenses 800 as described above allows the light irradiated from the light source (not shown in the drawing) to be condensed on each pixel area with respective micro-lens to improve the numerical aperture of each pixel, making the display image luminous by substantially improving numerical aperture of each pixel. Moreover, dust and foreign particles adhered on the electronic optical device can be de-focused in the present embodiment by providing the third transparent substrate 500 or 600. Although the overall thickness of the electronic optical device is increased while also increasing its heat capacity by adding the third substrate to the first and second substrates, absorption of heat to the first, second and third substrates can be suppressed because of the highly efficient use of luminous energy by the micro-lenses. Accordingly, the micro-lens allows temperature increase of the electronic optical device to be prevented even when the overall thickness of the electronic optical device is increased by providing the third substrate, also preventing malfunctioning of the electronic optical device.

Although the third substrates 500 and 600 are shown to have a similar size to the second substrate 400 and first substrate 300, respectively, in the drawing of the embodiment described above, it is not necessarily required that the sizes of the third substrates 500 and 600 are the same as the first or second substrate. The third substrates 500 and 600 may be larger or smaller than the first and second substrates, which does not create any problems if the third substrates 500 and 600 are formed at least to cover the display area.

Figure 20:
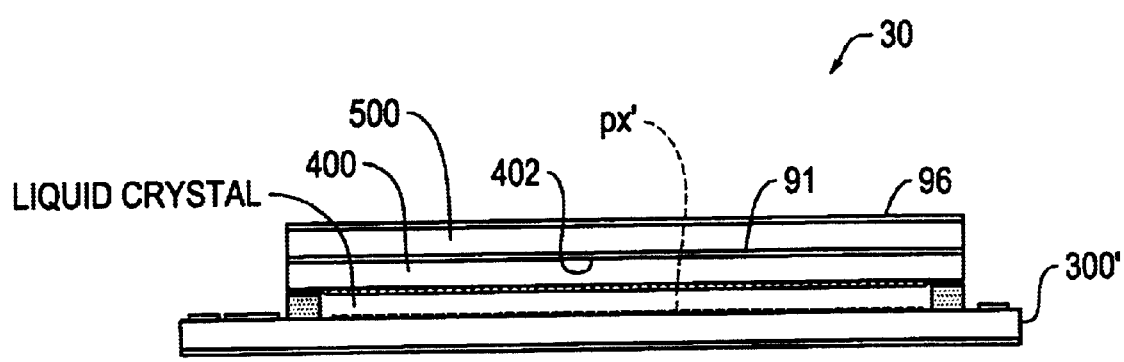
FIG. 20 is a cross section of the electronic optical device according to a modification.

The above embodiments are described in utilizing transparent type electronic optical devices having first transparent substrate, second transparent substrate, and third transparent substrate. However, the embodiments are not limited to the transparent type electronic optical devices. Namely, the embodiments are applicable to a reflective type optical-electro device wherein a silicon substrates are used for the first transparent substrate, and reflective electrodes made of aluminum or the like are used for the pixel electrodes arranged in a matrix. Such a construction will be described utilizing FIG. 20. The construction is almost the same as in the first to fifth embodiments, only differences will be explained. As shown in FIG. 20, the reflective electrodes PX' is arranged on the silicon substrate 300', and the second substrate is a transparent substrate and the third transparent substrate is arranged on the second transparent substrate. By disposing the third transparent substrate on the second transparent substrate, flaws and dust are never adhered on the outer face of the second substrate. Further, even if flaws and dust are adhered on the outer face of the third substrate, flaws and dust are defocused. Therefore, flaws and dust are not displayed on the projection image. Furthermore, when the second transparent substrate is adhered to the third transparent substrate by an adhesive material, if there is flaw, such flaw is filled by the adhesive material so as to be repaired.

When the above embodiments are utilized in the projector, it is possible to adhere one polarizing means to a prism unit 42. By adhering the polarizing means to the prism unit 42, the heat of the polarizing means is absorbed in the prism unit 42, so that the temperature increase of the electronic optical device can be prevented. Further, since the distance between the surface of liquid crystal and the polarizing means is made longer, flaw and dust which may be generated at the time of adhering the polarizing means to the prism unit can be likely to be defocused. As mentioned above, by having the third transparent substrate, it is possible to prevent flaw and dust from adhering at least one of the first and second substrate. By adhering the polarizing means to the prism unit 42, flaw and dust may be defocused because the polarizing means are apart from the liquid crystal surface, so that the display quality can be enhanced.

There is an air layer (gap) between the electronic optical device and the polarizing means. Therefore, when a cooling means is disposed at the upper or lower side of the prism unit 42 to feed a cooling air between the electronic optical device and the polarizing means, the temperature increase of the electronic optical device can be prevented, and misoperation due to the temperature increase can be prevented. The above embodiments are explained utilizing a liquid crystal device, but they are applicable to an electronic optical device such as a light emitting device, or a plasma display device. As previously described, the electronic optical device according to the present invention positions a liquid crystal in inside of the two sheets of the transparent substrates (the first and second transparent substrates), a planar surface of the third transparent substrate being adhered on the outer face of the two sheets of the transparent substrates. Accordingly, flaws and dust are never adhered on the outer face of the first or second transparent substrate according to the present invention. Since a distance corresponding to the thickness of the third transparent substrate is maintained between the outer face of the thickness of the third transparent substrate and the electronic optical device, the outer face of the third transparent substrate is always de-focused. Therefore, the display image has a high quality because flaws and dust on the outer face of the third transparent substrate, which are adhered, are not projected on the projection image. Both of the adhesive and third transparent substrate have approximately the same refractive index to the transparent substrates to be adhered thereon, so that there is no reflection boundary face between the transparent substrate and adhesive to result in a small luminous energy loss.

Accordingly, an increase of production cost can be suppressed because any reflection preventing film is required to be formed between each transparent substrate and adhesive. It is also advantageous that there is no chance of malfunctioning due to the reflected light, since the light is not reflected in the electronic optical device. Moreover, since the adhesive has an approximately equal refractive index to the first or second transparent substrate on which the adhesive is coated, flaws and dust adhered on the outer face of the first or second transparent substrate can be buried with the adhesive used for repair. The liquid crystal has a larger heat capacity because of the third transparent substrate. Consequently, temperature increase remains small in the electronic optical device along a partial temperature increase is suppressed, thereby preventing distribution of transmittance or deterioration of the electronic optical device because of the temperature difference.

In addition to the effects as described above, the design margin of the opening of the case can be relatively easily enlarged in the electronic optical device provided with the first partitioning periphery according to the present invention, which makes the image quality high and the production cost low.

What is claimed is:

1. An electronic optical device, comprising:
   a first substrate on which pixel electrodes are formed, the first substrate having an outer surface;
   a second substrate opposing the first substrate, the second substrate having an outer surface;
   an electronic optical material disposed between the second substrate and the first substrate and sealed by a seal material;
   a third substrate provided at the outer surface of at least one of the first substrate and the second substrate;
   a display area formed more inner side than the seal material;
   a light-shielding film provided with an opposing surface side between the first substrate and the second substrate, the light-shielding film provided so as to define an inside edge of an effective display area;
   a light-shielding case made from light-shielding material and having an upper edge being formed so as to overlap an area for forming the seal material and a side edge connected to the upper edge and covering side faces of the first, second and third substrates the upper edge has a larger opening than the opening of the light-shielding film, and the light-shielding case accommodates the first substrate the second substrate and the third substrate such that the side edge prevents light from entering from the side faces of the first, second and third substrates; and
   a non-effective display area formed by the light shielding film and the edge of the light-shielding case.

2. The electronic optical device according to claim 1, a size of the third substrate and one of the second substrate are substantially the same.

3. The electronic optical device according to claim 1, at least an outer surface of the light-shielding film is formed of a light reflection film having an OD value of 2 or more.

4. The electronic optical device according to claim 1, at least an inner surface of the light-shielding film is formed of a light-absorbing film having an OD value of 2 or more.

5. The electronic optical device according to claim 1, further comprising a second light-shielding film provided in an outer surface of the third substrate.

6. The electronic optical device according to claim 1, wherein an inner edge of the light-shielding case and an outer edge of the light-shielding film are at a substantially same position as seen in plan view.

7. An electronic optical device, comprising:
a first substrate on a display area of which pixel electrodes are formed, the first substrate having an outer surface;
a second substrate opposing the first substrate, the second substrate having an outer surface;
an electronic optical material disposed between the second substrate and the first substrate and sealed by a seal material;
a third substrate provided at the outer surface of the first substrate;
a first light-shielding film provided in an outer surface of the third substrate and with an opposing surface side between the first substrate and the third substrate;
the first light-shielding film being formed so as to overlap an area for forming the seal material, and the first light-shielding film having a larger opening than a second light-shielding film; the
second light-shielding film provided with an opposing surface side between the first substrate and the second substrate, the second light-shielding film is provided so as to define an effective display area and to expose the area for forming the seal material;
a light-shielding case made from light-shielding material and having an edge being formed so as to overlap an area for forming the seal material, the edge is closer to the first light-shielding than to the second light-shielding film and has a larger opening than the opening of the first light-shielding film, and the light-shielding case accommodates the first substrate, the second substrate and the third substrate; and
a non-effective display area formed by the light-shielding film, the second light-shielding film and the edge of the light-shielding case.

8. The electronic optical device according to claim 7, a plan-view size of the third substrate and a plan-view size of the second substrate being substantially the same.

9. The electronic optical device according to claim 7, at least an outer surface of at least one of the first and second light-shielding films being formed of a light reflection film having an OD value of 2 or more.

10. The electronic optical device according to claim 7, at least an inner surface of at least one of the first and second light-shielding films being formed of a light-absorbing film having an OD value of 2 or more.

11. An electronic optical device, comprising:
a first substrate on which pixel electrodes are formed, the first substrate having an outer surface;
a second substrate opposing the first substrate, the second substrate having an outer surface;
an electronic optical material disposed between the second substrate and the first substrate and sealed by a seal material;
a third substrate provided at the outer surface of at least one of the first substrate and the second substrate, the third substrate having a thickness of at least 1.0 mm;
a display area formed more inner side than the seal material;
a light-shielding film provided with an opposing surface side between the first substrate and the second substrate, the light-shielding film provided so as to define an effective display area;
a light-shielding case that has an edge being formed so as to overlap an area for forming the seal material, the edge has a larger-opening than the opening of the light-shielding film, and the light-shielding case accommodates the first substrate, the second substrate and the third substrate.

12. The electronic optical device according to claim 11, a plan-view size of the third substrate and a plan-view size of the second substrate being substantially the same.

13. The electronic optical device according to claim 11, at least an outer surface of the light-shielding film being formed of a light reflection film having an OD value of 2 or more.

14. The electronic optical device according to claim 11, at least an inner surface of the light-shielding film being formed of a light-absorbing film having an OD value of 2 or more.

15. The electronic optical device according to claim 11, further comprising a second light-shielding film provided on an outer surface of the third substrate.

16. An electronic optical device, comprising:
a first substrate on a display area of which pixel electrodes are formed, the first substrate having an outer surface;
a second substrate opposing the first substrate, the second substrate having an outer surface;
an electronic optical material disposed between the second substrate and the first substrate and sealed by a seal material;
a third substrate provided at the outer surface of the first substrate, the third substrate having a thickness of at least 1.0 mm;
a first light-shielding film provided in an outer surface of the third substrate and with an opposing surface side between the first substrate and the third substrate;
the first light-shielding film being formed so as to overlap an area for forming the seal material; and
a second light-shielding film provided with an opposing surface side between the first substrate and the second substrate, the second light-shielding film is provided so as to define an effective display area and to expose the area for forming the seal material.

17. The electronic optical device according to claim 16, a plan-view size of the third substrate and a plan-view size of the second substrate being substantially the same.

18. The electronic optical device according to claim 16, at least an outer surface of at least one of the first and second light-shielding films being formed of a light reflection film having an OD value of 2 or more.

19. The electronic optical device according to claim 16, at least an inner surface of at least one of the first and second light-shielding films being formed of a light-absorbing film having an OD value of 2 or more.

20. An electronic optical device, comprising:
a first substrate on which pixel electrodes are formed, the first substrate having an outer surface;
a second substrate opposing the first substrate, the second substrate having an outer surface;
an electronic optical material disposed between the second substrate and the first substrate and sealed by a seal material;
a third substrate provided at the outer surface of at least one of the first substrate and the second substrate;
a display area formed more inner side than the seal material;
a light-shielding film provided with an opposing surface side between the first substrate and the second substrate, the light-shielding film provided so as to define an effective display area and having an OD value of 2 or more;

a light-shielding case that has an edge being formed so as to overlap an area for forming the seal material, the edge has a larger opening than the opening of the light-shielding film, and the light-shielding case accommodates the first substrate, the second substrate and the third substrate.

21. The electronic optical device according to claim 20, a plan-view size of the third substrate and a plan-view size of the second substrate being substantially the same.

22. The electronic optical device according to claim 20, at least an outer surface of the light-shielding film being formed of a light reflection film having an OD value of 2 or more.

23. The electronic optical device according to claim 20, at least an inner surface of the light-shielding film being formed of a light-absorbing film having an OD value of 2 or more.

24. The electronic optical device according to claim 20, further comprising a second light-shielding film provided on an outer surface of the third substrate.

25. An electronic optical device, comprising:

a first substrate on a display area of which pixel electrodes are formed, the first substrate having an outer surface;

a second substrate opposing the first substrate, the second substrate having an outer surface;

an electronic optical material disposed between the second substrate and the first substrate and sealed by a seal material;

a third substrate provided at the outer surface of the first substrate;

a first light-shielding film provided in an outer surface of the third substrate and with an opposing surface side between the first substrate and the third substrate;

the first light-shielding film being formed so as to overlap an area for forming the seal material, at least one of the first and second light-shielding films having an OD value of 2 or more; and a second light-shielding film provided with an opposing surface side between the first substrate and the second substrate, the second light-shielding film is provided so as to define an effective display area and to expose the area for forming the seal material.

26. The electronic optical device according to claim 25, a plan-view size of the third substrate and a plan-view size of the second substrate being substantially the same.

27. The electronic optical device according to claim 25, both of the first and second light-shielding films having the OD value of 2 or more.

28. The electronic optical device according to claim 25, at least an outer surface of the light-shielding film being formed of a light reflection film having the OD value of 2 or more.

29. The electronic optical device according to claims 25, at least an inner surface of the light-shielding film being formed of a light-absorbing film having the OD value of 2 or more.

30. An electronic optical device, comprising:

a first substrate on which pixel electrodes are formed, the first substrate having an outer surface;

a second substrate opposing the first substrate, the second substrate having an outer surface;

an electronic optical material disposed between the second substrate and the first substrate and sealed by a seal material;

a third substrate provided at the outer surface of at least one of the first substrate and the second substrate;

a display area formed more inner side than the seal material;

a light-shielding film provided with an opposing surface side between the first substrate and the second substrate, the light-shielding film provided so as to define an effective display area;

a light-shielding case that has an edge being formed so as to overlap an area for forming the seal material, the edge has a larger opening than the opening of the light-shielding film, and the light-shielding case accommodates the first substrate, the second substrate and the third substrate; and at least one adhesive layer adhering the third substrate with at least one of the first substrate and the second substrate, the adhesive layer having a thickness of 5 $\mu$m to 30 $\mu$m.

31. The electronic optical device according to claim 30, a plan-view size of the third substrate and a plan-view size of the second substrate being substantially the same.

32. The electronic optical device according to claim 30, at least an outer surface of the light-shielding film being formed of a light reflection film having an OD value of 2 or more.

33. The electronic optical device according to claim 30, at least an inner surface of the light-shielding film being formed of a light-absorbing film halving an OD value of 2 or more.

34. The electronic optical device according to claim 30, further comprising a second light-shielding film provided on an outer surface of the third substrate.

35. The electronic optical device according to claim 30, wherein the thickness of the adhesive layer is 5 $\mu$m to 10 $\mu$m.

36. An electronic optical device, comprising:

a first substrate on a display area of which pixel electrodes are formed, the first substrate having an outer surface;

a second substrate opposing the first substrate, the second substrate having an outer surface;

an electronic optical material disposed between the second substrate and the first substrate and sealed by a seal material;

a third substrate provided at the outer surface of the first substrate;

a first light-shielding film provided in an outer surface of the third substrate and with an opposing surface side between the first substrate and the third substrate;

the first light-shielding film being formed so as to overlap an area for forming the seal material;

a second light-shielding film provided with an opposing surface side between the first substrate and the second substrate, the second light-shielding film is provided so as to define an effective display area and to expose the area for forming the seal material; and at least one adhesive layer adhering the third substrate with at least one of the first substrate and the second substrate, the adhesive layer having a thickness of 5 $\mu$m to 30 $\mu$m.

37. The electronic optical device according to claim 36, a plan-view size of the third substrate and a plan-view size of the second substrate being substantially the same.

38. The electronic optical device according to claim 36, at least an outer surface of at least one of the first and second light-shielding films being formed of a light reflection film having an OD value of 2 or more.

39. The electronic optical device according to claim 36, at least an inner surface of at least one of the first and second light-shielding films being formed of a light-absorbing film having an OD value of 2 or more.

40. The electronic optical device according to claim 36, wherein the thickness of the adhesive layer is 5 µm to 10 µm.

* * * * *